(12) United States Patent
Yoon et al.

(10) Patent No.: US 9,891,787 B2
(45) Date of Patent: Feb. 13, 2018

(54) METHOD AND APPARATUS OF OPERATING ELECTRONIC DEVICE

(71) Applicant: Samsung Electronics Co., Ltd., Suwon-si, Gyeonggi-do (KR)

(72) Inventors: Jin Yoon, Seoul (KR); Youngjoo Park, Yongin-si (KR); Sungjae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 14/288,813

(22) Filed: May 28, 2014

(65) Prior Publication Data

US 2014/0359502 A1 Dec. 4, 2014

Related U.S. Application Data

(60) Provisional application No. 61/827,956, filed on May 28, 2013.

(51) Int. Cl.
*G06F 3/0482* (2013.01)
*G06F 3/0481* (2013.01)
*G06F 3/0488* (2013.01)

(52) U.S. Cl.
CPC .......... *G06F 3/0482* (2013.01); *G06F 3/0488* (2013.01); *G06F 3/04817* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 8,099,332 B2* | 1/2012 | Lemay | ...................... | G06F 8/61 705/26.1 |
| 8,411,201 B2* | 4/2013 | Kang | ............... | H04N 21/42214 348/553 |
| 2002/0160817 A1* | 10/2002 | Salmimaa | ........... | G06F 3/04817 455/566 |
| 2009/0013275 A1* | 1/2009 | May | ...................... | G06F 3/0483 715/765 |
| 2009/0307105 A1* | 12/2009 | Lemay | ...................... | G06F 8/61 705/26.1 |
| 2011/0154256 A1 | 6/2011 | Bahg | | |
| 2011/0307354 A1* | 12/2011 | Erman | ...................... | G06F 8/60 705/27.1 |
| 2012/0026400 A1* | 2/2012 | Kang | ............... | H04N 21/42214 348/570 |
| 2012/0072283 A1* | 3/2012 | DeVore | ............. | G06Q 30/0251 705/14.49 |
| 2012/0254246 A1* | 10/2012 | Kerger | .................. | H04W 4/206 707/780 |
| 2012/0316955 A1* | 12/2012 | Panguluri | .............. | G06Q 30/02 705/14.41 |
| 2013/0125056 A1* | 5/2013 | Suda | ...................... | G06F 3/0488 715/846 |

(Continued)

*Primary Examiner* — William Bashore
*Assistant Examiner* — Nathan Shrewsbury
(74) *Attorney, Agent, or Firm* — Jefferson IP Law, LLP

(57) ABSTRACT

A method and an apparatus of operating an electronic device are provided. The method includes receiving an input for displaying an object screen in a state where a function execution screen is displayed, displaying the object screen in an overlaid manner on a part of the function execution screen in response to the input, and executing a function in response to a user input made on the object screen.

18 Claims, 28 Drawing Sheets

(56) References Cited

U.S. PATENT DOCUMENTS

| | | | |
|---|---|---|---|
| 2013/0132896 A1* | 5/2013 | Lee | G06F 17/30997 715/808 |
| 2013/0187866 A1* | 7/2013 | Kim | G06F 3/0488 345/173 |
| 2013/0232183 A1* | 9/2013 | Lee | H04L 67/10 709/201 |
| 2013/0232256 A1* | 9/2013 | Lee | H04L 43/04 709/224 |
| 2013/0268967 A1* | 10/2013 | Kang | H04N 21/42214 725/40 |
| 2013/0275260 A1* | 10/2013 | Ito | G06Q 30/0631 705/26.7 |
| 2013/0325856 A1* | 12/2013 | Soto Matamala | G06F 17/3089 707/724 |
| 2014/0181725 A1* | 6/2014 | Yang | G06F 9/4443 715/777 |
| 2014/0283142 A1* | 9/2014 | Shepherd | G06F 3/0482 726/30 |
| 2015/0095819 A1* | 4/2015 | Hong | G06F 3/04817 715/765 |

* cited by examiner

METHOD AND APPARATUS OF OPERATING ELECTRONIC DEVICE

CROSS-REFERENCE TO RELATED APPLICATIONS

This application claims the benefit under 35 U.S.C. § 119(e) of a U.S. Provisional application filed on May 28, 2013 in the U.S. Patent and Trademark Office and assigned Ser. No. 61/827,956, the entire disclosure of which is hereby incorporated by reference.

TECHNICAL FIELD

The present disclosure relates to a method and apparatus of operating an electronic device.

BACKGROUND

An electronic device is provided with a screen capable of checking and executing applications installed therein. The screen may display application execution icons and folders containing application execution icons. The user may select a folder displayed on the screen to check the application execution icons contained in the selected folder.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus of operating an electronic device.

Although it is well configured to present the applications installed in the electric device, the conventional screen lacks in function of displaying objects conditionally. Furthermore, in order to open a folder while another folder has been opened with a certain layout, it is necessary to perform burdensome stepwise manipulation of closing the currently opened folder and navigating to the higher folder and selecting the target folder. That is, the navigation between folders requires cumbersome stepwise manipulations.

Another aspect of the present disclosure is to provide the user with the diverse screen displays adaptive to conditions.

Another aspect of the present disclosure is to provide the user with the screen display presenting collected uninstalled applications as well as the applications installed in the electronic device already.

Another aspect of the present disclosure is to provide the level of the folder selected to be opened and facilitating navigation between folders that are equal or different in level.

In accordance with an aspect of the present disclosure, a method of operating an electronic device is provided. The method includes receiving an input for displaying an object screen in a state where a function execution screen is displayed, displaying the object screen in an overlaid manner on a part of the function execution screen in response to the input, and executing a function in response to a user input made on the object screen.

In accordance with another aspect of the present disclosure, an apparatus for operating an electronic device is provided. The apparatus includes a touch screen unit and a control unit configured to receive an input for displaying an object screen in a state where a function execution screen is displayed, to display the object screen in an overlaid manner on a part of the function execution screen in response to the input, and to execute a function in response to a user input made on the object screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a document" includes reference to one or more of such documents.

In this disclosure, a touch-sensitive device may include, but not limited to, a mobile phone, a smart phone, a notebook, a laptop computer, a tablet Personal Computer (PC), a handheld PC, a digital broadcasting terminal, a Personal Digital Assistant (PDA), a Portable Multimedia Player (PMP), a navigation terminal, a media player, a mobile medical device, a digital camera, a portable game console, an electronic dictionary, an electronic scheduler, a wearable device, and any other equivalents.

In an embodiment of the present disclosure, the term 'object screen' may denote the screen including execution icons of applications installed in the electronic device, favorite webpage icons, folders, files, images, and the like. In an embodiment of the present disclosure, the object screen may include at least one tab screen (e.g., 'recent' tab screen, 'object' tab screen, 'download' tab screen, and 'recommend' tab screen). The objects may be presented differently depending on the tab screen. In detail, the recent tab screen may be the screen of displaying the objects running and/or having execution history. The object tab screen may be the screen presenting the objects installed in the electronic device that are arranged according to the user setting. The download tab screen may be the screen presenting the objects installed in the electronic device. The 'recommend' tab screen presents the objects recommended based on the information on the objects executed by user.

Figure 1:
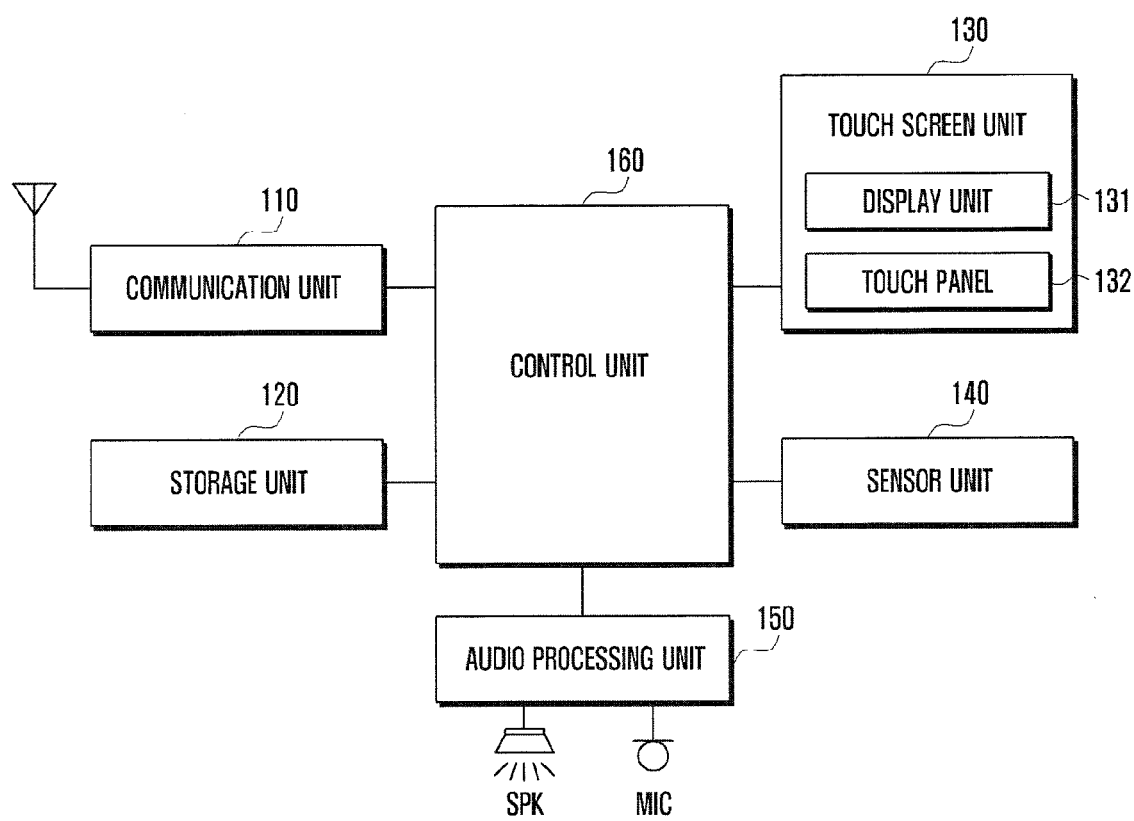
FIG. 1 is a block diagram illustrating a configuration of an electronic device according to an embodiment of the present disclosure.

FIG. 1 is a block diagram illustrating a configuration of the electronic device according to an embodiment of the present disclosure.

Referring to FIG. 1, the electronic device according to an embodiment of the present disclosure includes a communication unit 110, a storage unit 120, a touch screen unit 130, a sensor unit 140, an audio processing unit module 150, and a control unit 160, but is not limited thereto.

The communication unit 110 is responsible for voice, video, and data communication with an external device through the network. The communication unit 110 may include a Radio Frequency (RF) transmitter for up-converting and amplifying the transmission signal and an RF receiver for low noise amplifying and down-converting the received signal. Further, the communication unit 110 may include a modulator and a demodulator, which may provide a specific communication service such as Code Division Multiple Access (CDMA), Wideband CDMA (WCDMA), Long Term Evolution (LTE), Wireless Fidelity (WiFi), Wireless-Broadband (Wibro), Bluetooth, Near Field Communication (NFC), and the like. The communication unit 110 may be formed of a mobile communication module, an internet communication module, and/or a short-range communication module.

Particularly, the communication unit 110 may receive various applications from an external server (e.g., application store server) under the control of the control unit 160.

The storage unit 120 may be provide with a program memory for storing operation programs of the electronic device and a data memory for storing data generated by the programs.

The touch screen unit 130 may be integrally formed with a display unit 131 and a touch panel 132, but is not limited thereto. The display unit 131 may display various screen images according to use of the electronic device under control of the control unit 160. The display unit 131 may be formed of a Liquid Crystal Display (LCD), an Organic Light Emitted Diode (OLED), and an Active Matrix Organic Light Emitted Diode (AMOLED). The touch panel 132 may be a complex touch panel including a hand touch panel detecting a gesture of a hand and a pen touch panel detecting a gesture of a pen.

Particularly, the touch screen unit 130 may display a function execution screen and an object screen under the control of the control unit 160. The touch screen unit 130 may detect at least one user input (among management mode entry input, tab switching input, and object selection input) and displays a screen corresponding to the detected user input.

The sensor unit 140 detects a state of the electronic device. The sensor unit 140 may include one of an acceleration sensor, a geomagnetic sensor, a gyro sensor, and the like, and may detect a movement and a rotation state of the electronic device.

Particularly, the sensor unit 140 detects the motion of the electronic device and generates a detection signal to the control unit 160.

The audio processing unit 150 may perform the function of transmitting an audio signal received from the control unit 160 to the Speaker (SPK), and transmitting an audio signal such as a voice received from the Microphone (MIC) to the control unit 160. The audio processing unit 150 may convert voice/sound data into audible sounds and output the audible sounds through the speaker under control of the control unit 160, and may transmit audio signals such as a voice received from the MIC into digital signal and transmit the digital signal to the control unit 160.

Particularly, the audio processing unit 150 may transfer the voice signal input through the MIC to the control unit 160.

The control unit 160 controls the overall operation of the touch-sensitive device and a signal flow between internal components of the touch-sensitive device, performs a function to process data, and controls the supply of electric power from a battery to such internal components.

Particularly, the control unit 160 detects an input for displaying an object screen in the state of executing a function with the display of function execution screen and controls such that the object screen is displayed in an overlaid manner on the function execution screen. The control unit 160 detects one of the management mode entry input, tab switching input, and object selection input in the state that the object screen has been displayed and executes the function corresponding to the detected input.

If the management mode entry input is detected on the object screen, the control unit 160 enters (i.e., switches to) the management mode and controls the electronic device to process the object (i.e., item and folder), for example, move item and folder, create folder, change folder name, and delete item.

If the tab switching input is detected on the object screen, the control unit 160 may execute the function of switching between tabs. The object screen may be provided with 'recent' tab screen, 'object' tab screen, 'download' tab screen, and 'recommend' tab screen; and the control unit 160 may control such that the screen is displayed with the objects aligned based on the filtering conditions according to the selected tab switching input.

If the object selection input is detected on the object screen, the control unit 160 may perform the function associated with the item folder according to the property of the object. If the object is an item, the control unit 160 may execute the item and, otherwise if the object is a folder, a popup window corresponding to the folder. The popup window may include at least one item sorted into a group corresponding to the folder. In response to the inter-folder navigation event (e.g., folder switching event) detected in the state that the popup window of the folder, the control unit 160 may navigate between folders that are equal or different in hierarchical level.

Although not shown nor described herein, in addition to the above-discussed elements, the touch-sensitive device may further include any other essential and/or optional element such as a Global Positioning System (GPS) module for receiving and acquiring location information, a camera module for capturing a still or moving image, an input unit based on a hard key, and the like. As will be understood by those skilled in the art, some of the above-mentioned elements in the touch-sensitive device may be omitted or replaced with another.

Figure 2A:
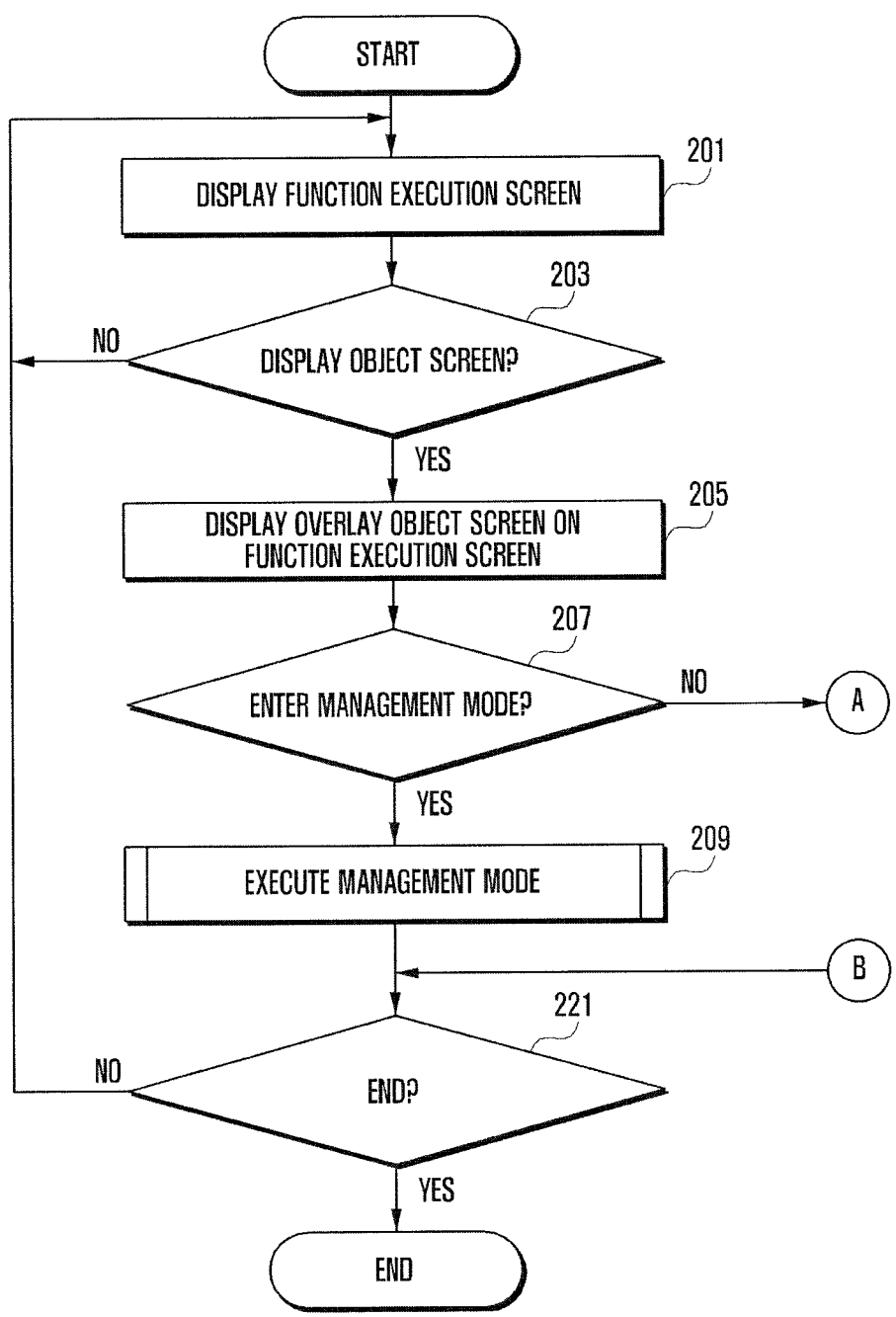
FIGS. 2A and 2B are diagrams illustrating an operation method of an electronic device according to an embodiment of the present disclosure.
Figure 2B:
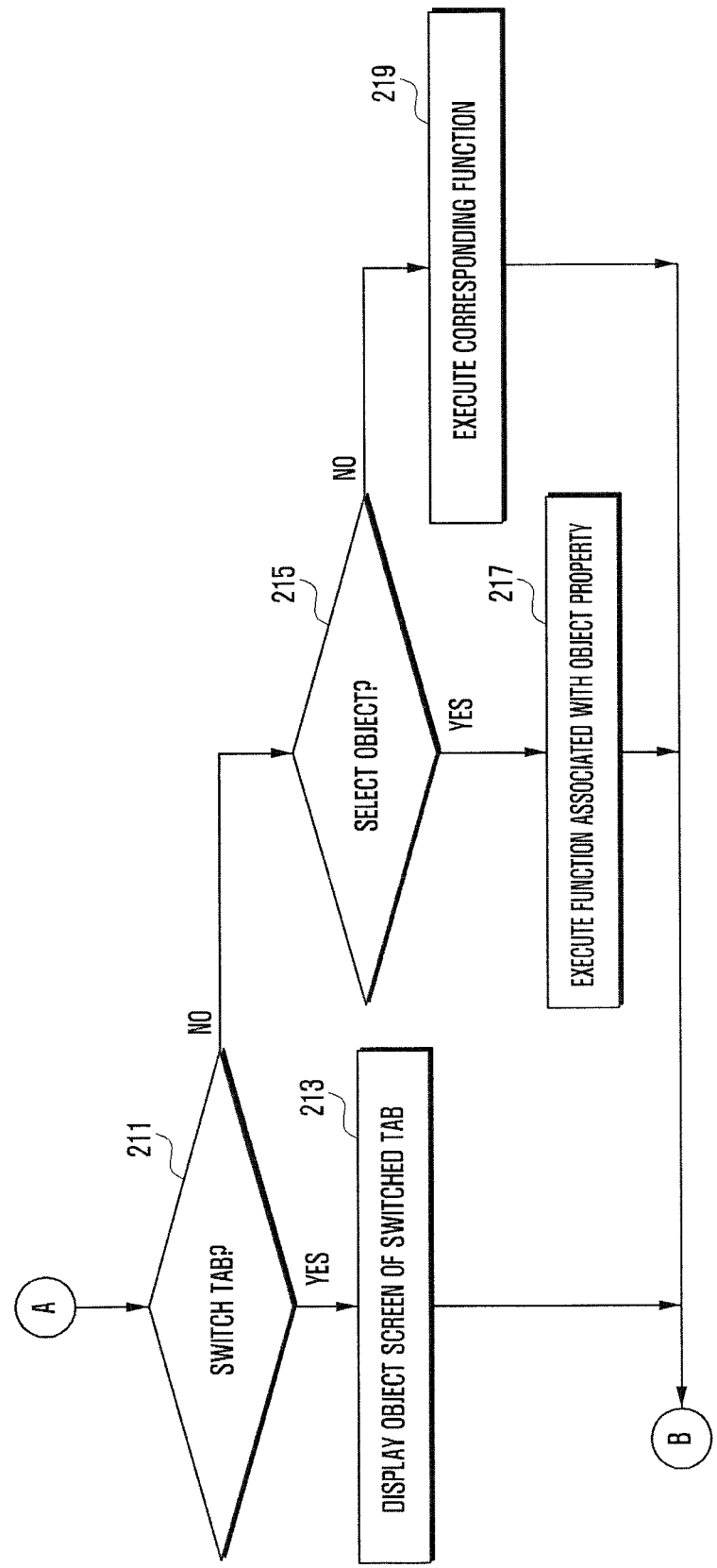

FIGS. 2A and 2B are diagrams illustrating the operation method of an electronic device according to an embodiment of the present disclosure.

Referring to FIGS. 2A and 2B, the control unit 160 may display a function execution screen at operation 201. In an embodiment of the present disclosure, the function execution screen may be the execution screen of an application.

The control unit 160 may determine whether an input for display an object screen is detected on the function execution screen at operation 203. The object screen may be the screen presenting execution icons of applications installed in the electronic device, favorite webpage icons, folders, files, and images. The object screen may be provided with a plurality of pages, each including at least one object aligned as predetermined. The object screen may present the icons representing the corresponding objects along with the object names and, in the case of being comprised of plural pages, provide a page number on every page.

In an embodiment of the present disclosure, if a touch input is detected on a button for displaying the object screen (e.g., application tray button) which is placed in the indicator area of the touch screen unit 130, the control unit 160 determines that it is requested to display the object screen. However, the present disclosure is not limited thereto but the control unit 160 may regard a loon press input onto a hard key (e.g., home key) provided on a side of the electronic device as the request for displaying the object screen.

In an embodiment of the present disclosure, if a touch input made onto the button designated for displaying the object screen is detected, the control unit 160 may display the screen including icons of all the objects installed in the electronic device and then, if a long press is detected on the hard key, display the 'recent' tab screen including the items that are currently running or have execution histories.

In an embodiment of the present disclosure, if a sliding gesture made downward is detected in the indicator area, the control unit 160 may determine this gesture as the input for displaying the object screen and thus control the touch screen unit 130 to display the object screen. The indicator area may be the area displayed always at a side (e.g., top side) of the display in an overlaid manner. In operation 203, if no input for displaying the object screen is detected, the process returns to operation 201.

If an input for displaying the object screen is detected, the control unit 160 may display the object screen in an overlaid manner on the function execution screen at operation 205. For example, the object screen may be displayed in an overlaid manner on the execution screen of a function which has been running before the detection of the input for displaying the object screen. In an embodiment of the present disclosure, the object screen overlaid on the function execution screen may be displayed semi-transparently at least at an area of the touch screen unit 130 (e.g., bottom area having a size predetermined). This means that the bottom area of the function execution screen may be shown vaguely through the semi-transparent object screen. Accordingly, the user may check the previous task with the function execution screen shown through the semi-transparent object screen.

In an embodiment of the present disclosure, if a touch input is detected on the semitransparent area of the object screen, the control unit 160 may control such that the object screen is pulled upward (e.g., toward the indicator area) and thus the function execution screen appears in full screen mode.

In the state that the object screen overlays on the function execution screen, the control unit 160 may determine whether to enter the management mode at operation 207. In an embodiment of the present disclosure, if a touch input is detected on a button (e.g., edit button) which is provided on the object screen for use in entering the management mode, the control unit 160 may determine the input as the request for entering the management mode. In an embodiment of the present disclosure, if a long press is detected on at least one of the objects presented on the object screen, the control unit 160 may determine the input as the request for entering the management mode.

After entering the management mode, the control unit 160 may execute the management mode at operation 209. In an embodiment of the present disclosure, the button designated for entering the management mode may be replaced by the button for ending (e.g., 'done' button) the management mode after entering the management mode.

The details of operation 209 of FIG. 2A is described with reference to FIGS. 3A and 3B.

If no management mode entry input is detected at operation 207, the control unit 160 may determine whether an input for tab switching in the state that the object screen is displayed in the overlaid manner on the execution screen at operation 211. The tab switching input may be made for switching the current screen to the 'recent' tab screen, 'object' tab screen, 'download' tab screen, or 'recommend' tab screen. If the tab switching input is detected at operation 211, the control unit 160 may control such that the object screen is displayed in response to the tab switching input.

The object screen display operation in response to the tab switching input at operations 211 to 213 is described later in detail with reference to FIGS. 5A to 5C.

If no tab switching input is detected at operation 211, the control unit 160 may determines whether an input for selecting at least one object on the object screen which is overlaid on the function execution screen at operation 215. If at least one object is selected, the control unit 160 may execute a function associated with the property of object at operation 217. The property of the object may be the indication on whether the object is an item or a folder. If the object is an item, the control unit 160 executes the item and controls such that the corresponding execution screen is displayed. If the object is a folder, the control unit 160 controls such that the folder is presented in the form of a popup window including at least one object. In an embodiment of the present disclosure, the control unit 160 may perform navigation between folders presented in the form of popup windows. If no object is selected, the control unit 160 may execute a corresponding function at operation 219.

The inter-folder navigation at operation 217 is described in detail later with reference to FIGS. 8 and 9A to 9F.

Figure 3A:
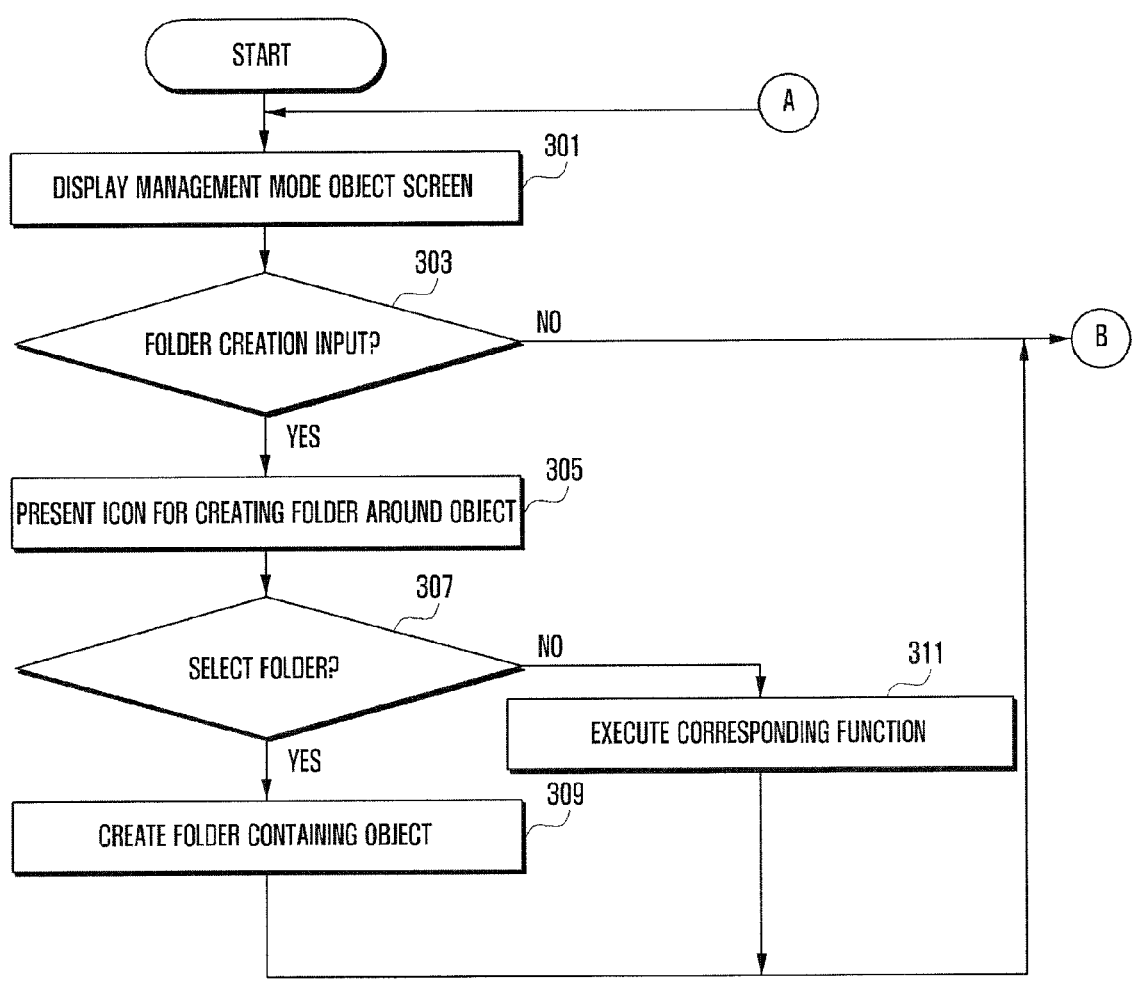
FIGS. 3A and 3B are flowcharts illustrating a management mode execution procedure for supporting operation of an electronic device according to an embodiment of the present disclosure.
Figure 3B:
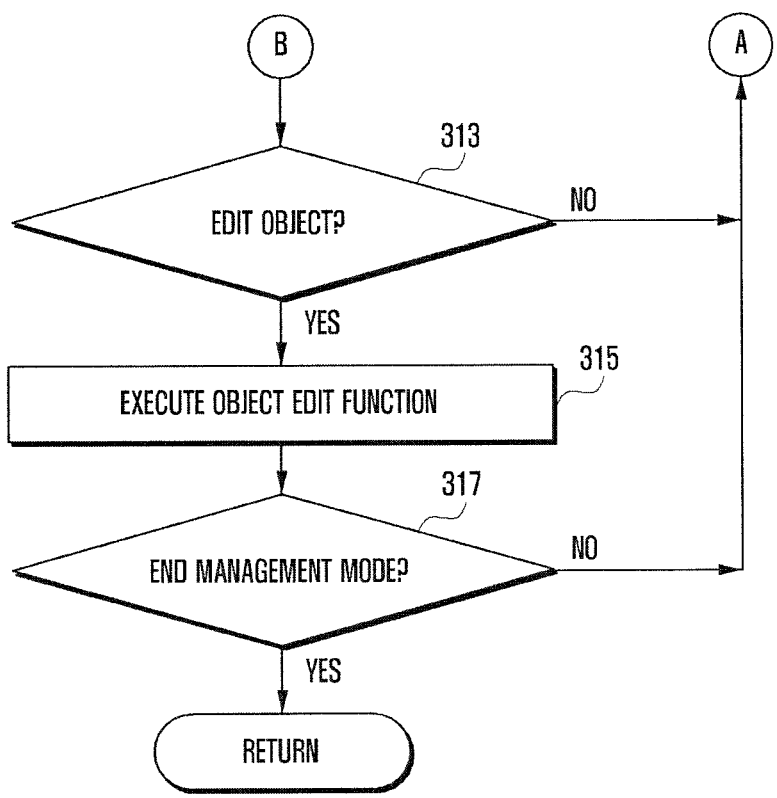

FIGS. 3A and 3B are flowcharts illustrating a management mode execution procedure for supporting operation of an electronic device according to an embodiment of the present disclosure. FIGS. 3A and 3B are provided to describe operation 209 of FIG. 2A.

Referring to FIGS. 3A and 3B, the control unit 160 may control the touch screen unit 130 to display a management mode object screen at operation 301. In an embodiment of the present disclosure, it is possible to perform various operations such as deleting item, moving item and folder, creating folder, and changing folder name.

The control unit 160 may determine whether an input for creating a folder is detected on the management mode object screen at operation 303. In an embodiment of the present disclosure, if a touch input is detected on at least one object presented on the object screen, the control unit 160 may determine this as an input for creating a folder. However, the present disclosure is not limited thereto.

If a touch input is detected on at least one object, the control unit 160 may display an icon for creating a folder in the form of a popup window near around the object at operation 305. The control unit 160 may determine whether an input for selecting the icon designated for generating a folder in the form of a popup window at operation 307. If the input for selecting the icon, the control unit 160 may generate the folder including the object on which the touch input is detected and control the touch screen unit 130 to display the folder at operation 309. In an embodiment of the present disclosure, the name of the created folder may be generated automatically according to a predetermined rule or input by user.

If no input of selecting the icon for creating a folder is detected, the control unit 160 may perform an operation of cancelling the input for creating the folder at operation 311. For example, if a touch input is detected outside the icon for creating a folder in the form of the popup window, the control unit 160 may determine the input as the request for canceling the input for creating the folder.

If no input for creating a folder is detected at operation 303, the control unit 160 may determine whether an input for editing at least one object presented on the management mode object screen at operation 313. If an input for editing the object is detected, the control unit 160 may execute the object edit function at operation 315. In an embodiment of the present disclosure, the input for editing at least one object may be the input for executing a function such as deleting the object and moving the object.

In the case of deleting or moving the object (e.g., moving an item between folder and relocating an item or folder), the control unit 160 controls such that the objects are rearranged automatically on the object screen and thus the space from which the deleted or moved object has disappeared is filled.

The control unit 160 may determine whether a management mode termination command is input at operation 317.

If the management mode termination command is detected, the control unit 160 ends the management mode and returns to the procedure of FIGS. 3A and 3B. If no management mode termination command is detected, the procedure returns to operation 301 where the control unit 160 controls the touch screen unit 130 to display the management mode object screen.

The operation method of the present disclosure is described in more detail hereinafter with reference FIGS. 2A, 2B, 3A, 3B, and 4A to 4J.

FIGS. 4A to 4J are diagrams illustrating screen displays for use in explaining an electronic device operating method according to an embodiment of the present disclosure.

In the following, the description is made under the assumption that the object screen includes at least one of items and folders. Also, it is assumed that the items include execution icons of applications and the folder contains at least one application execution icon.

Figure 4A:
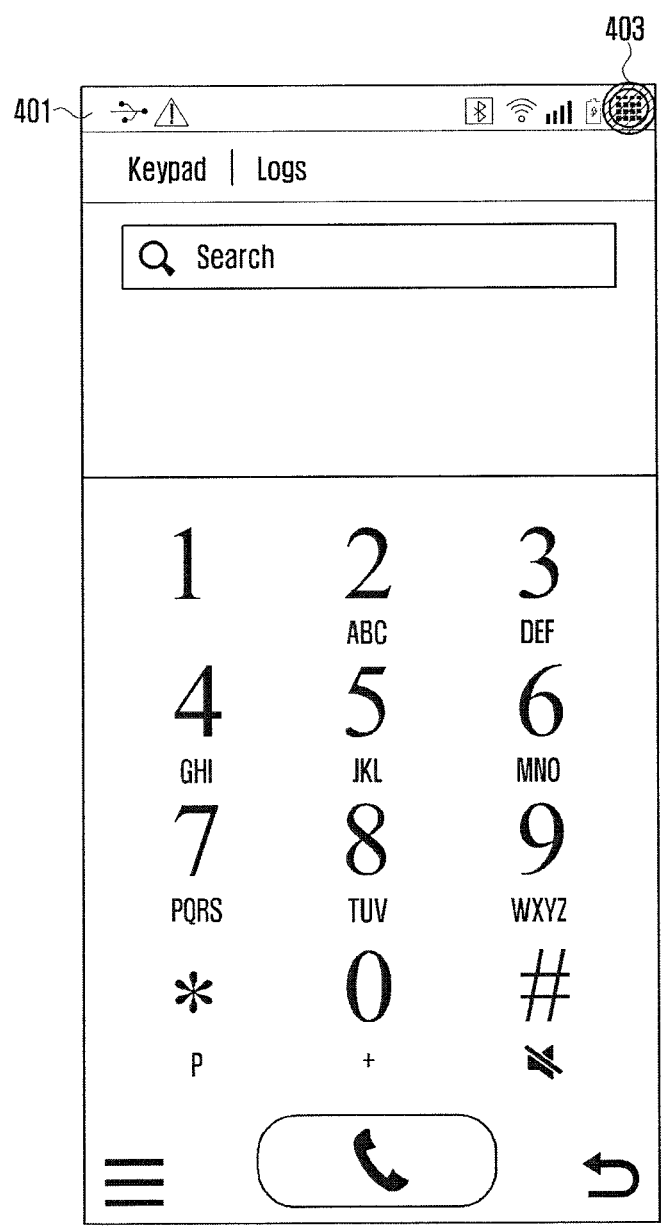
FIGS. 4A, 4B, 4C, 4D, 4E, 4F, 4G, 4H, 4I, and 4J are diagrams illustrating screen displays for use in explaining an electronic device operating method according to an embodiment of the present disclosure.
Figure 4B:
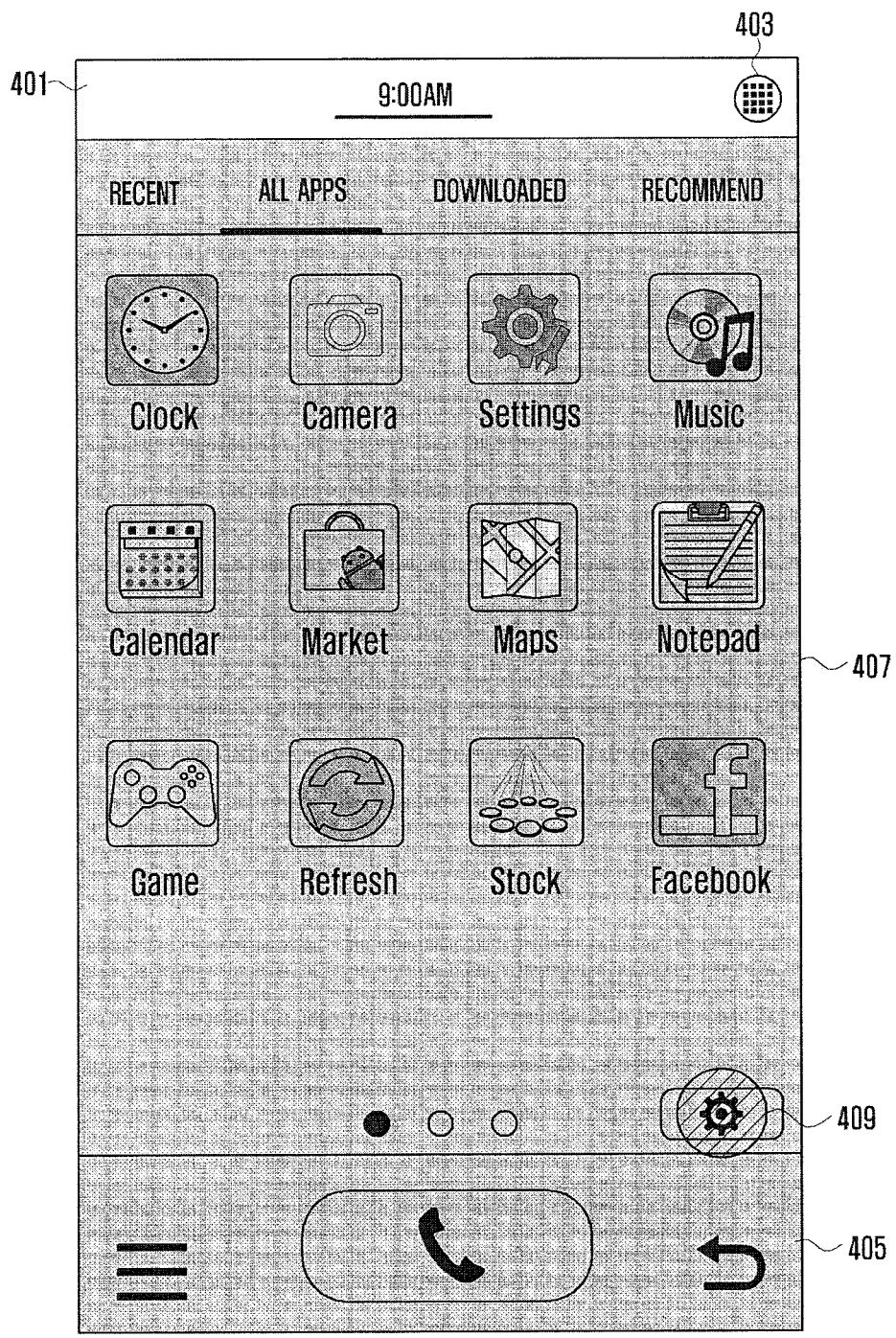

Referring to FIGS. 2A, 2B, 3A, 3B, and 4A to 4J, the control unit 160 may control the touch screen unit 130 to display an execution screen of a function (e.g., telephone application execution screen), as shown in FIG. 4A. In the state that the telephone application execution screen is displayed, the control unit 160 may determine whether a touch input is made on the button (e.g., application tray button 403), designated for displaying an object screen (e.g., screen including at least one of items and folders) in the indicator area 401 at operation 203. If a touch input is detected on the application tray button 403, the control unit 160 may control the touch screen unit 130 to display the object screen 407 of FIG. 4B in an overlaid manner on the telephone application execution screen of FIG. 4A at operation 205. The object screen may have a semi-transparent area 405 at its bottom. The control unit 160 may control such that the telephone application execution screen of FIG. 4A running on the background (i.e., the execution screen of the application which has been running on the foreground before the object screen is displayed) through the semi-transparent bottom area 405 of the object screen.

Figure 4C:
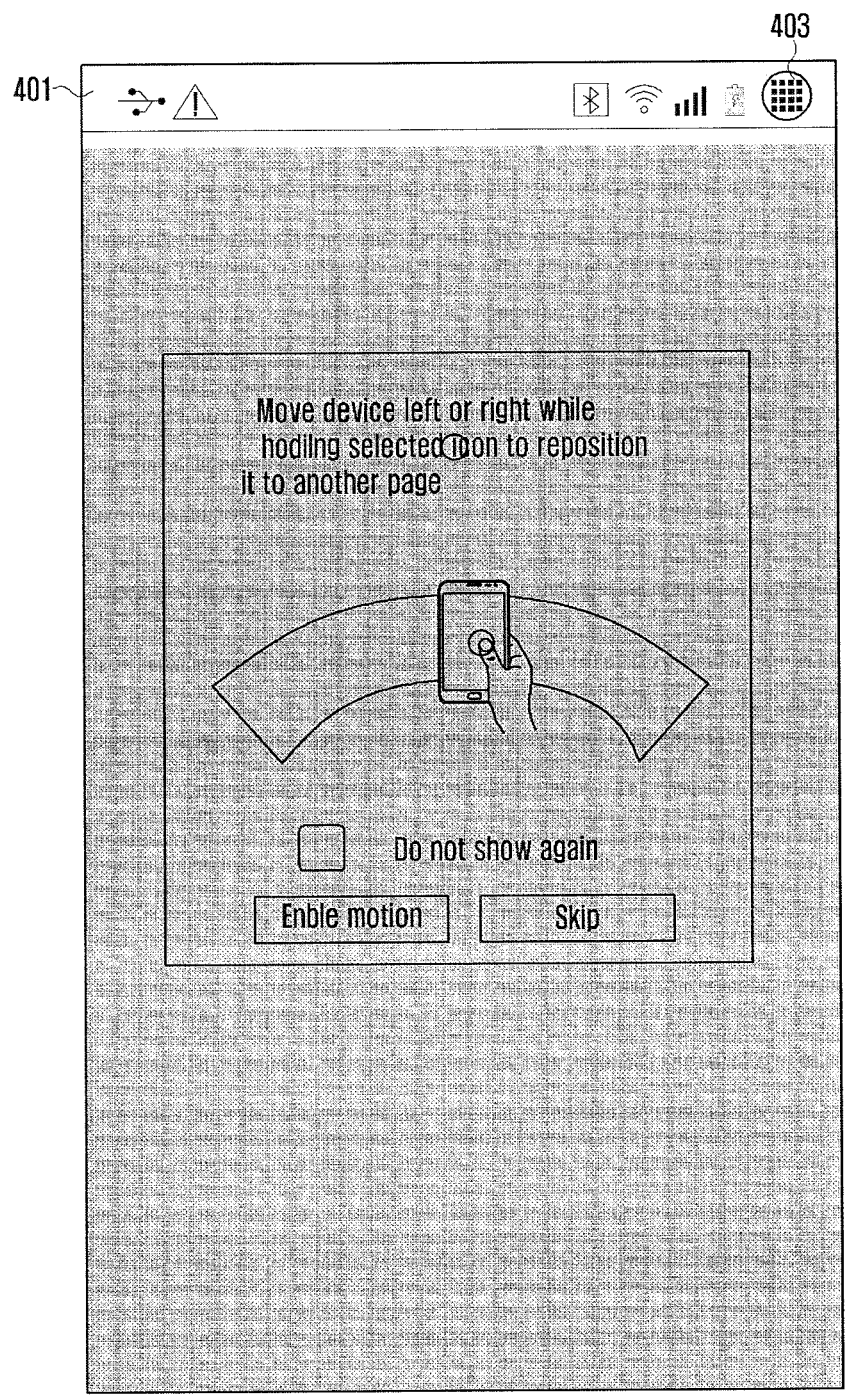
Figure 4D:
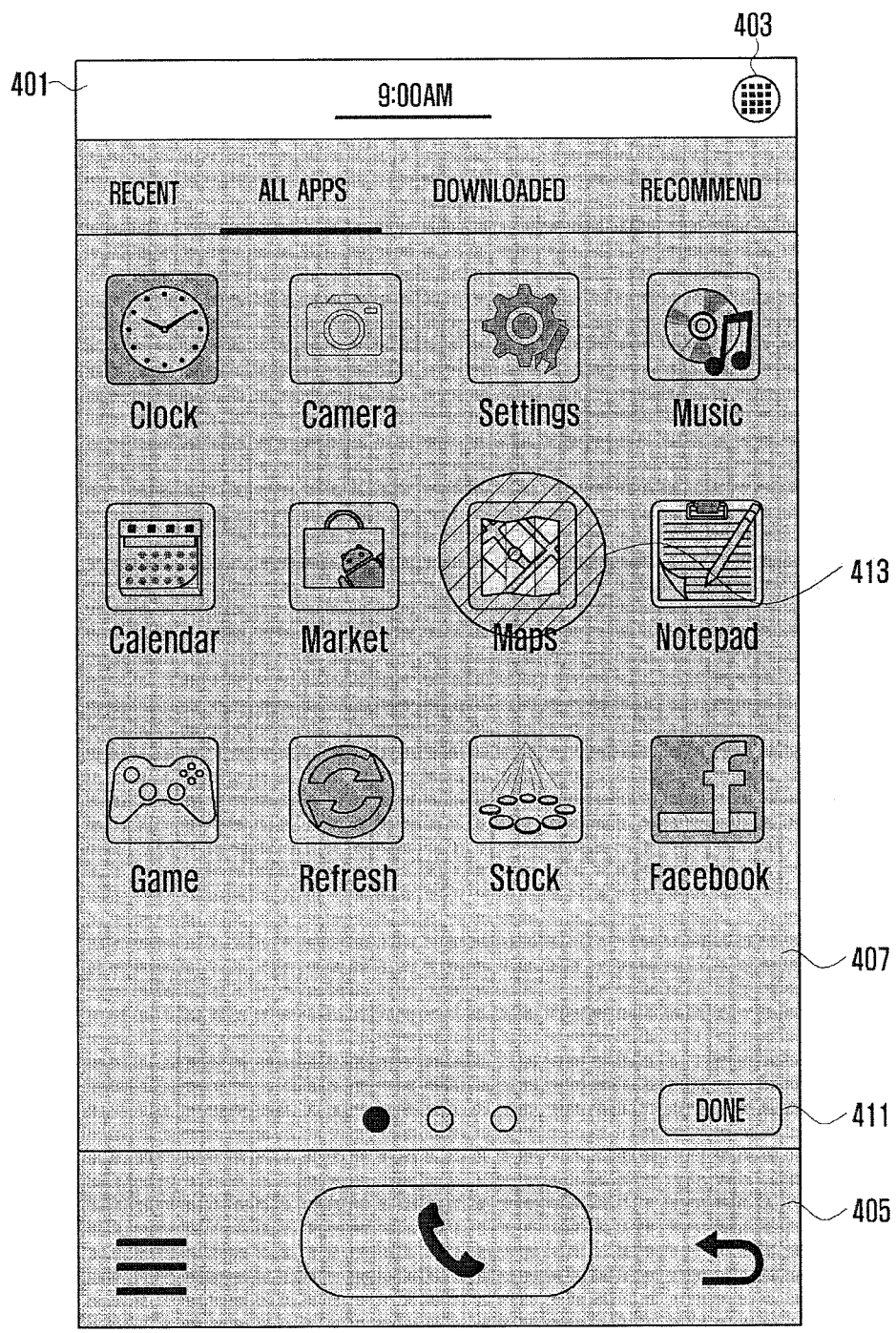
Figure 4E:
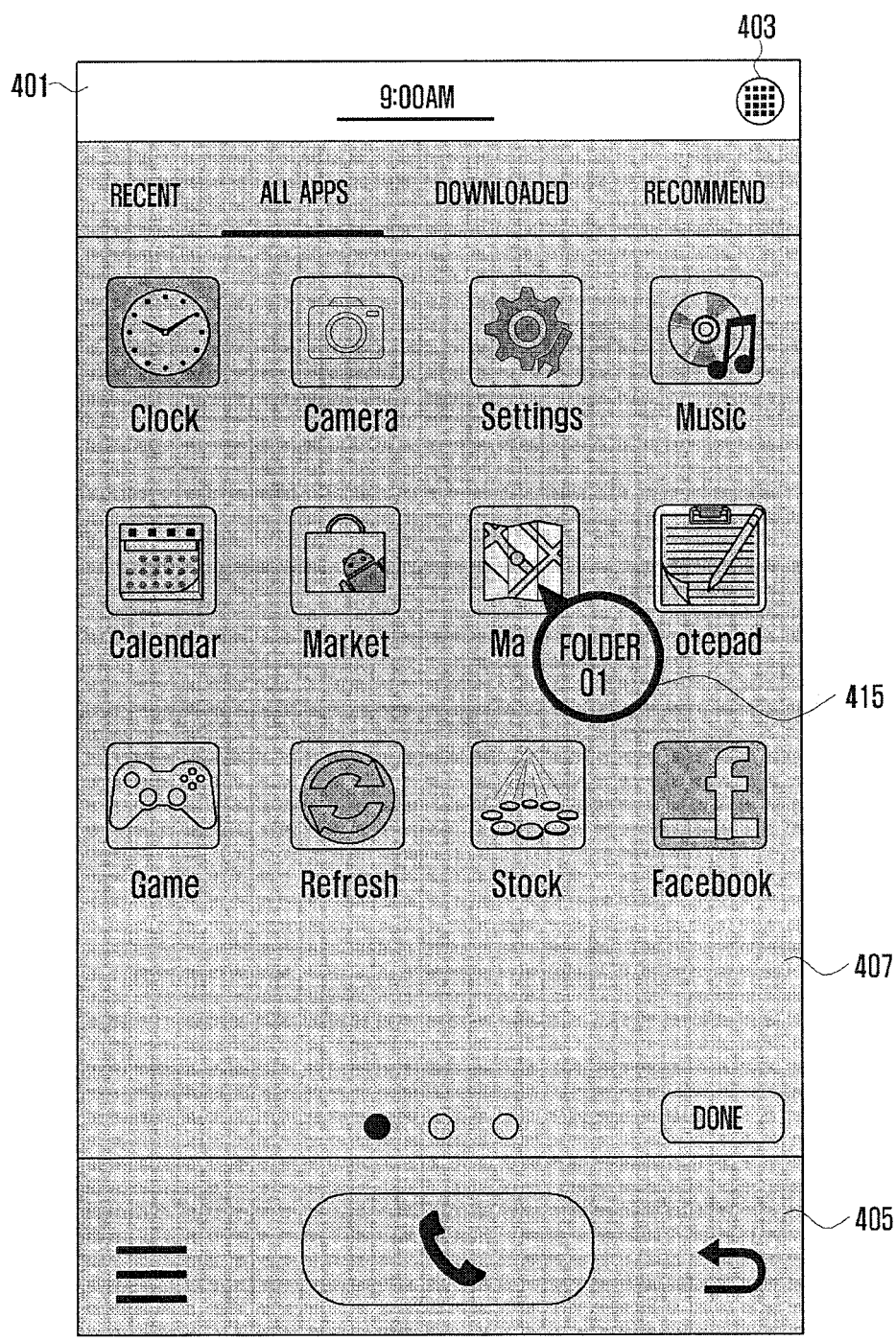
Figure 4F:
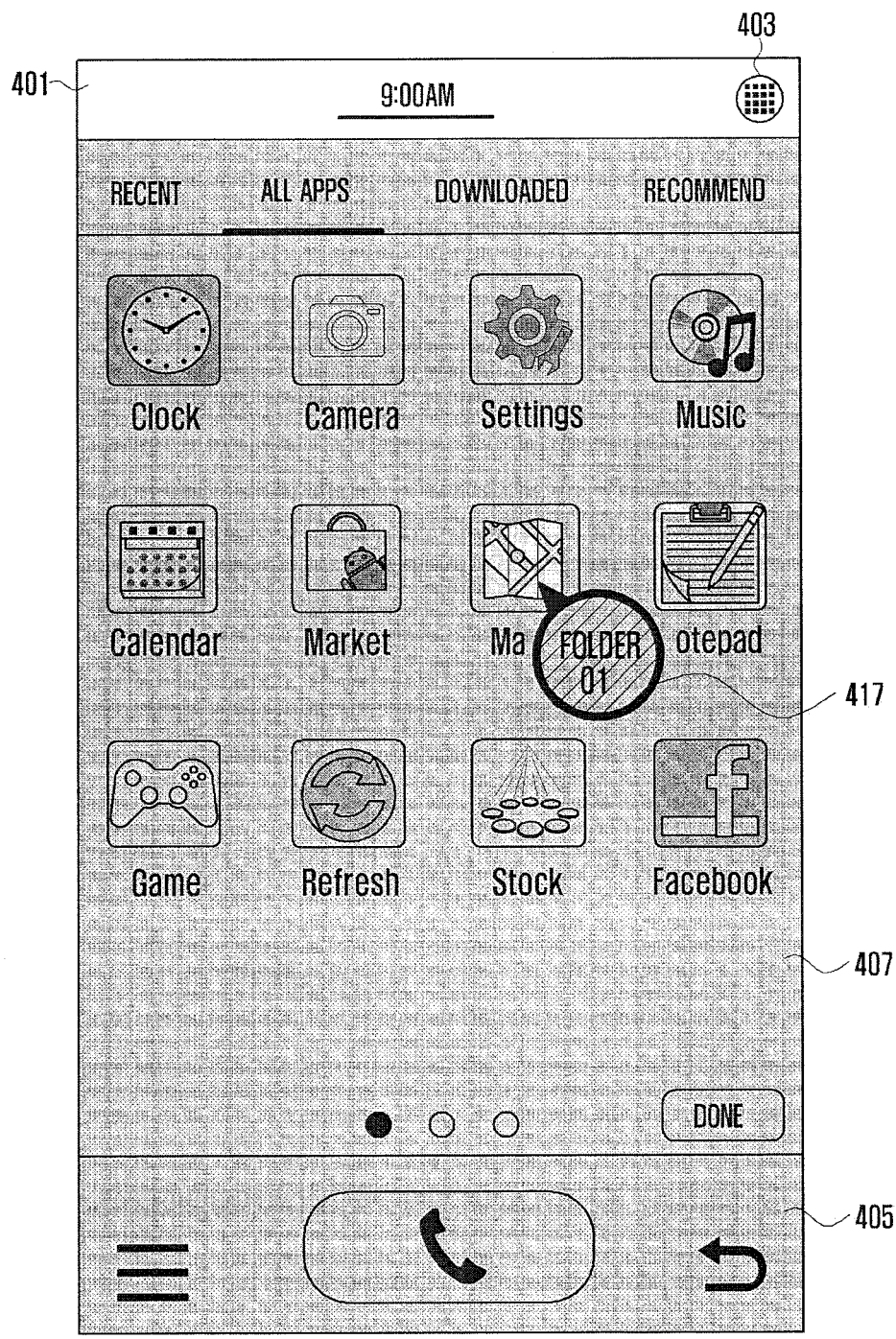
Figure 4G:
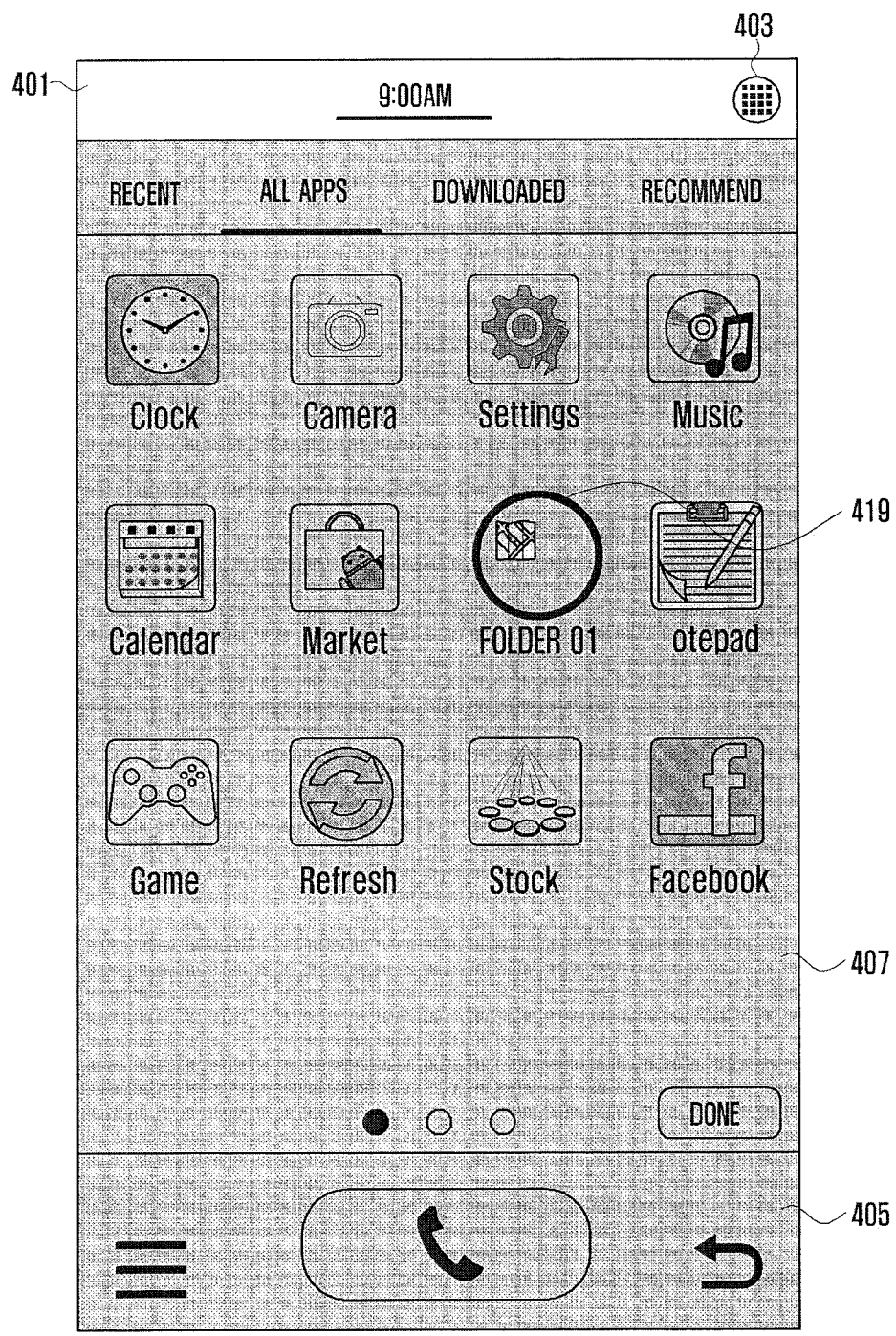

The control unit 160 may determine whether a touch input is detected on the button designated for management mode (i.e. edit button 409), at operation 207. If a touch input is detected on the edit button 409, the control unit 160 may display a guide popup window as shown in FIG. 4C and then the object screen of the management mode as shown in FIG. 4D. The guide popup window of FIG. 4C is optional so as to be displayed or not. The control unit 160 may execute the management mode with the management mode object screen displayed at operation 209 as shown in FIG. 4D. With the display of the management mode object screen, the edit button 409 of FIG. 4B may be replaced by 'done' button 411 of FIG. 4D.

In the detailed process of operation 209, the control unit 160 may display the object screen of the management mode as shown in FIG. 4D at operation 301. If an input for creating a folder 413 is detected at operation 303 (e.g., a touch input on an application execution icon), the control unit 160 may display an icon for creating a folder near around the corresponding application execution icon in the form of a popup window 415 of FIG. 4E. If a touch input is detected on the icon designated for creating a folder 417 of FIG. 4F at operation 307, the control unit 160 may generate the folder 419 including the application execution at operation 309. The name of the created folder may be generated according to a predetermined rule of the electronic device (e.g., in order of folder→folder 01→folder 02 . . . or apple→grape→strawberry . . . ) or input by the user.

Figure 4H:
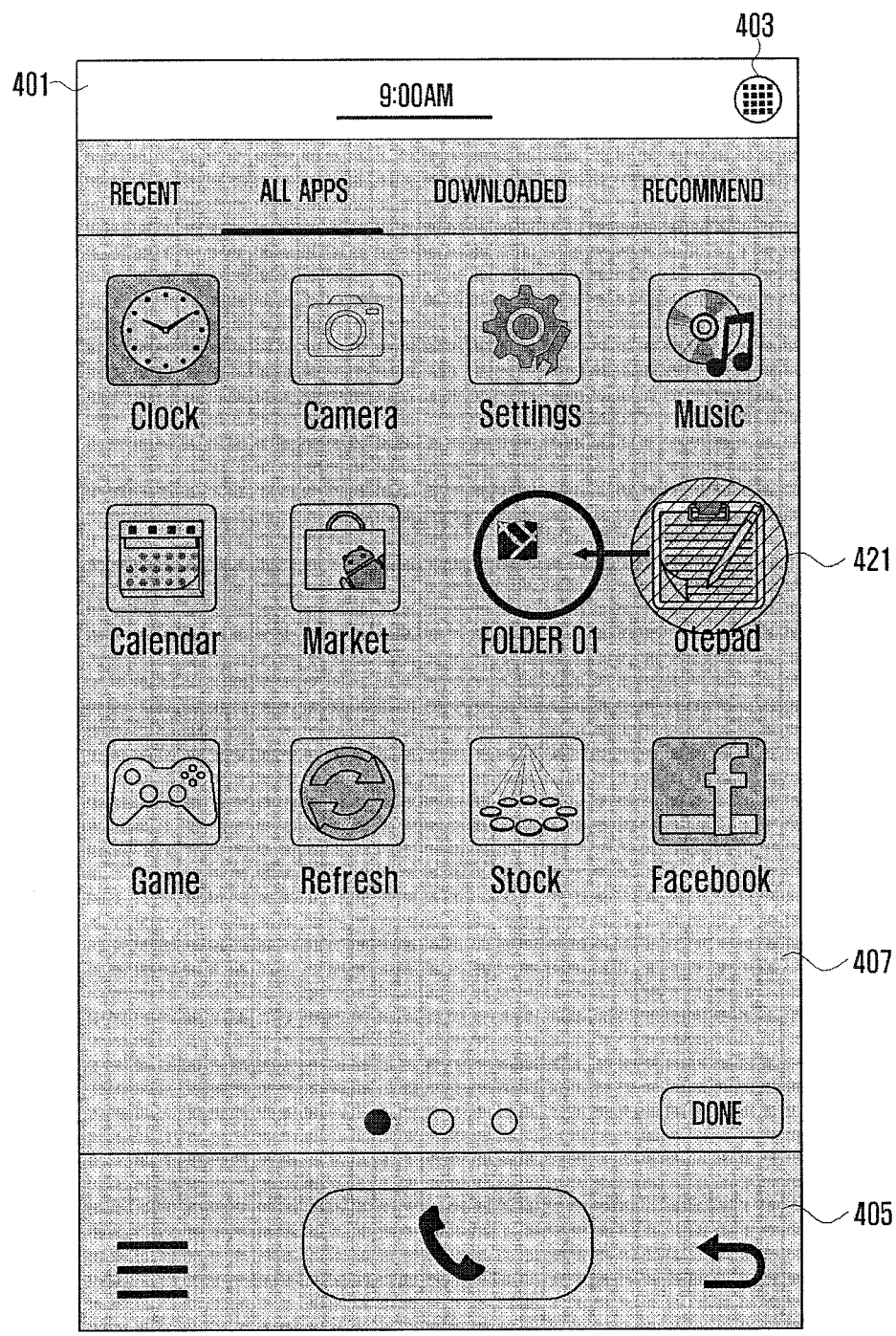
Figure 4I:
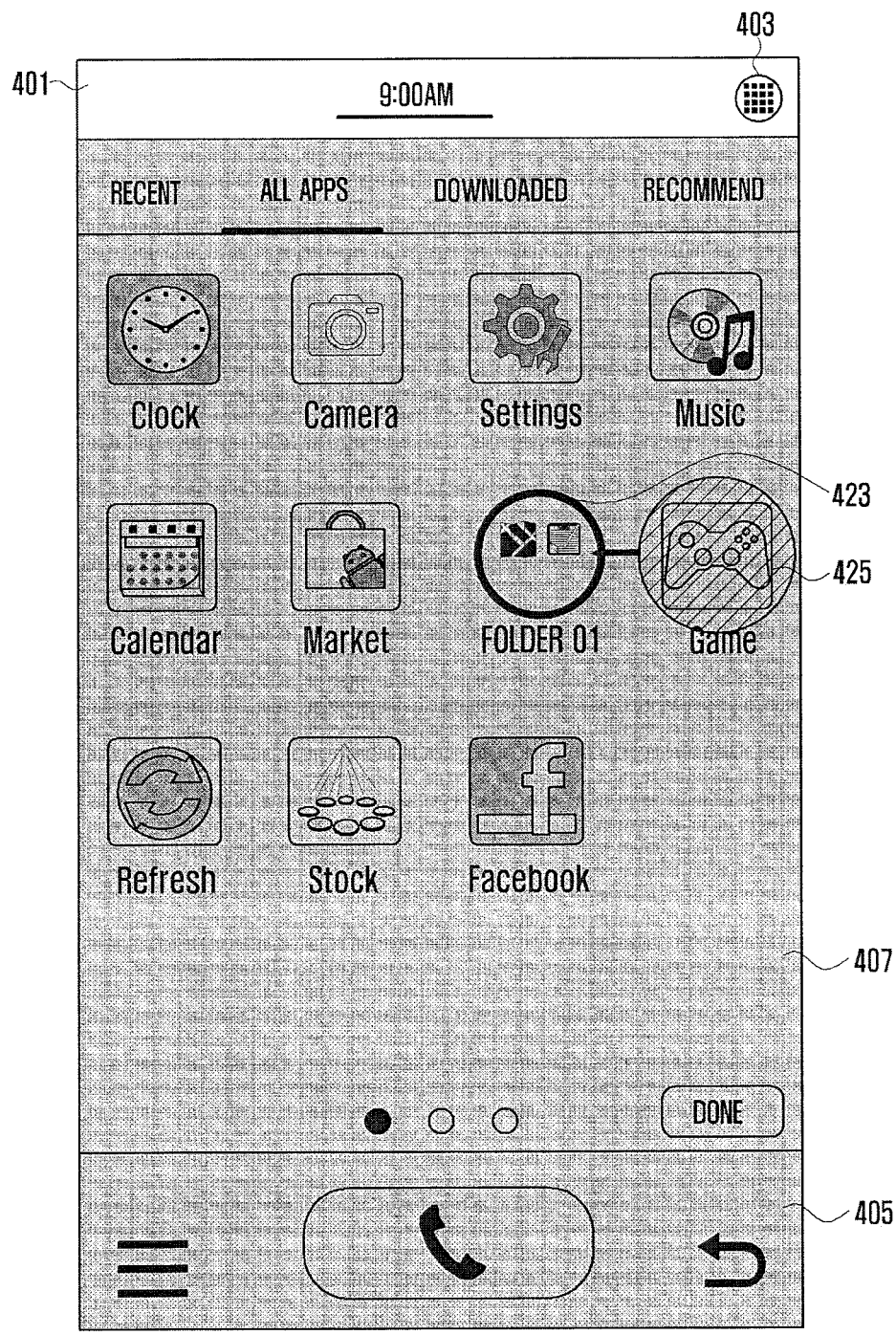
Figure 4J:
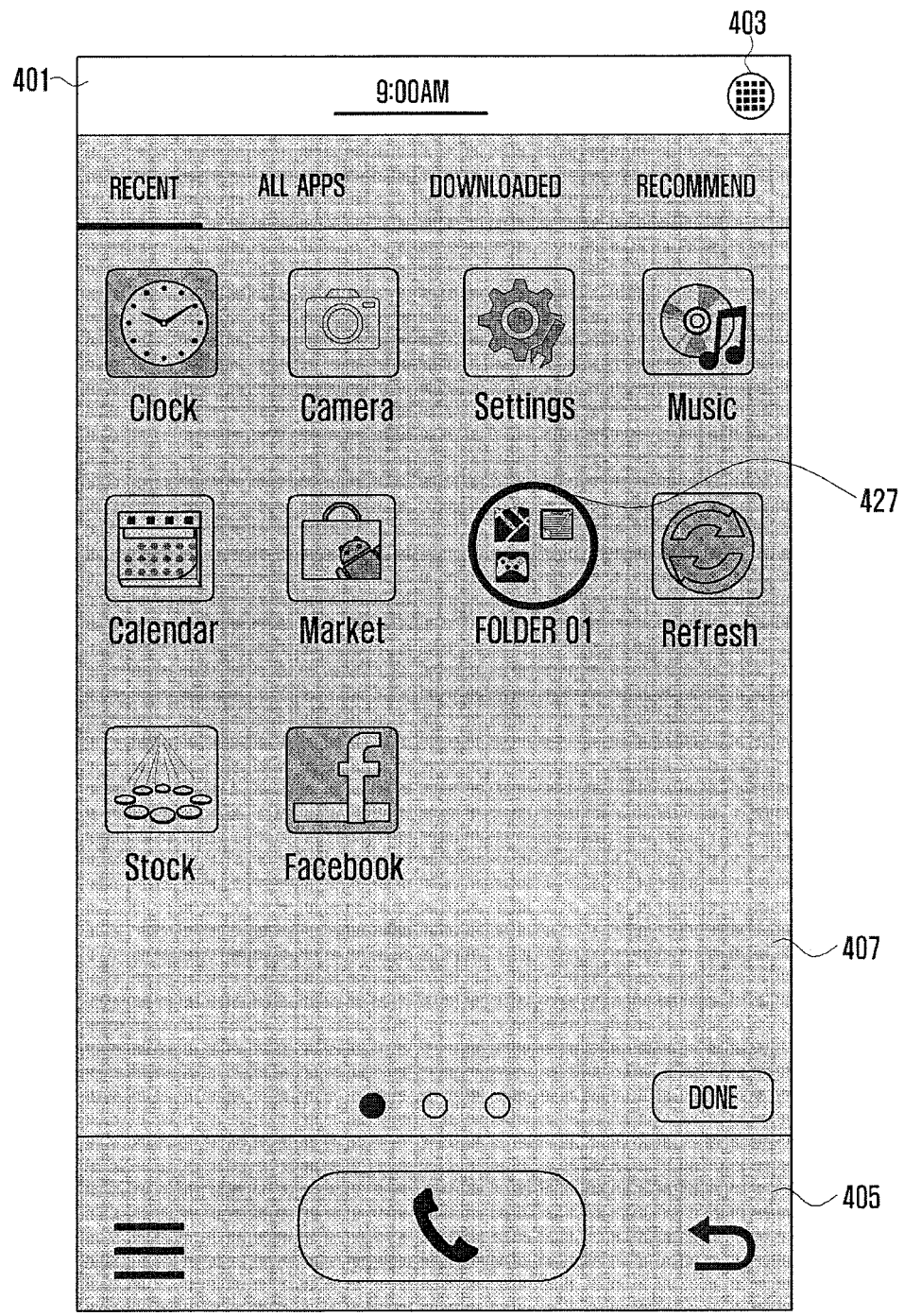

If a gesture of moving a selected application execution icon to a folder 421 of FIG. 4H (e.g., drag and drop gesture) is detected at operation 313, the control unit 160 may control such that the application execution icon 421 is included in the folder 423 of FIG. 4I at operation 315. If a gesture of moving a selected icon to the folder 425 of FIG. 4I at operation 313, the control unit 160 may control such that the application execution icon 425 is included in the folder 427 of FIG. 4J at operation 315.

Operations 211 to 213 of FIG. 2B are described in more detail hereinafter with reference to FIGS. 5A to 5C.

Figure 5A:
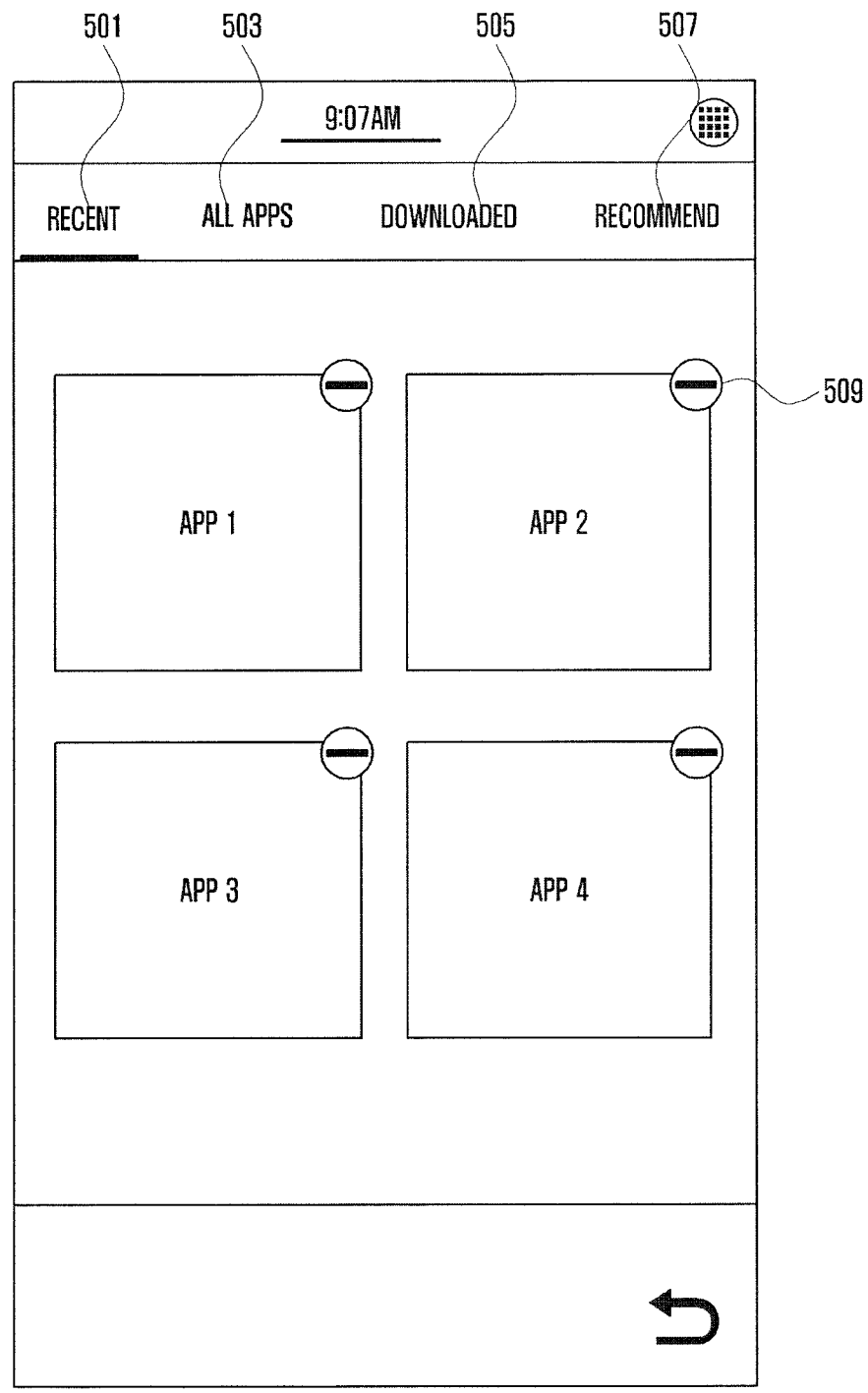
FIGS. 5A, 5B, and 5C are diagrams illustrating screen displays for use in explaining an electronic device operating method according to an embodiment of the present disclosure.
Figure 5B:
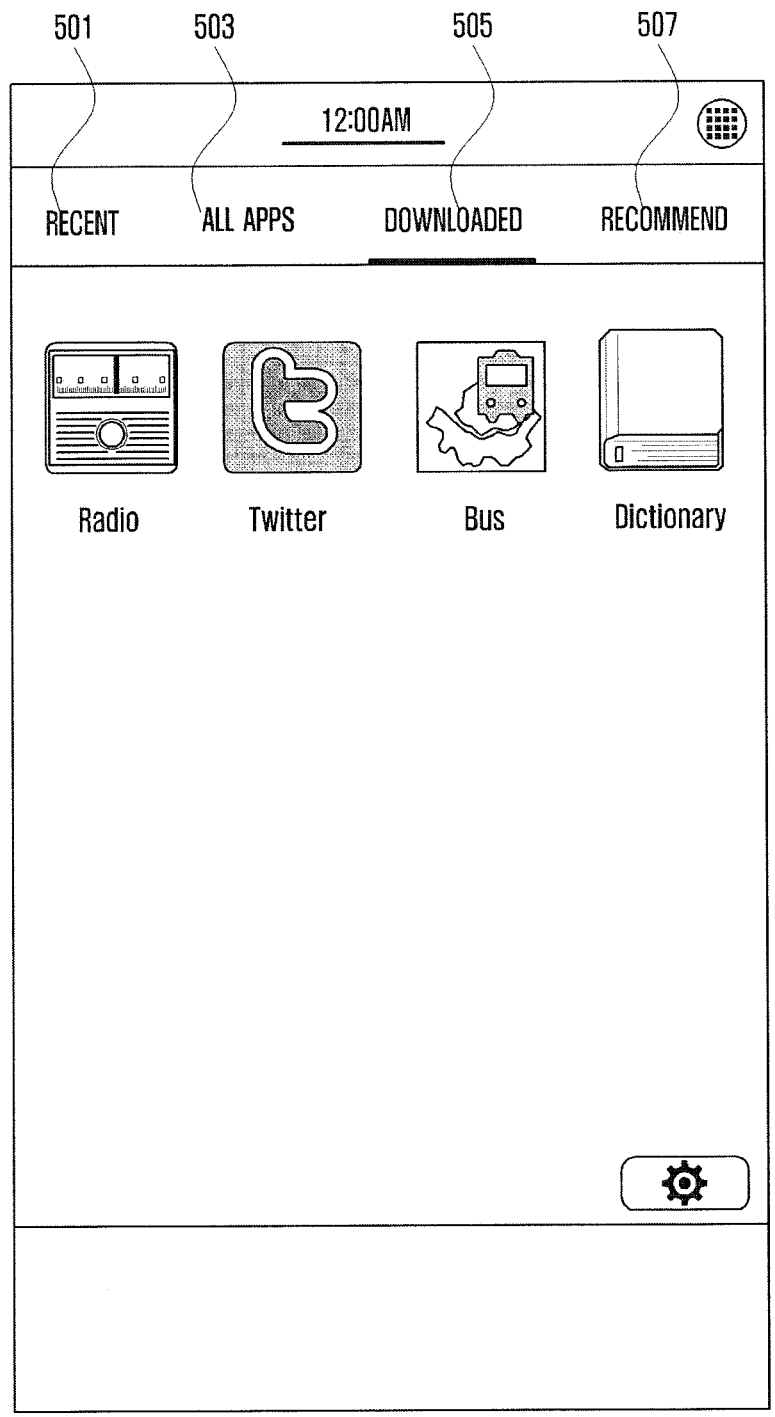
Figure 5C:

FIGS. 5A to 5C are diagrams illustrating screen displays for use in explaining an electronic device operating method according to an embodiment of the present disclosure.

Referring to FIGS. 5A to 5C, if a touch input is detected on the 'recent' tab 501, the control unit 160 may display the applications that are running currently or have recent execution histories such as application 1 (app1), application 2 (app2), application 3 (app3), and application 4 (app4) as shown in FIG. 5A. In an embodiment of the present disclosure, the touch screen unit 130 may arrange the applications in the order of app1→app2→app3→app4 from top left to bottom right horizontally on the application screen of the 'recent' tab. The applications also may be arranged in an order of execution time. However, the present disclosure is not limited thereto but may be embodied by arranging the application in an alphabetical order of the application names. In an embodiment of the present disclosure, the application 1 (app1), application 2 (app2), application 3 (app3), and application 4 (app4) arranged in the screen of the 'recent' tap 501 may be expressed by execution screen capture images or representative icons. The capture images may be the images taken when an application screen is switched to another application screen (e.g., another currently running application execution screen) in response to a cancel key (e.g., 'back' key) input. Each application execution screen may be provided with a 'delete' button (e.g., "-") 509 and thus, if necessary, the user may terminate the currently running application, the terminated application disappearing from the screen of the 'recent' tab. If the execution screen is not of the currently running application, it may be deleted from the execution list using the 'delete' button 509. If deleted from the execution list, the application disappears on the screen of the 'recent' tab but, if re-executed afterward, appears again.

In an embodiment of the present disclosure, if a touch input is detected on the 'all apps' tab 503, the control unit 160 may display all the applications installed in the electronic device and/or the applications downloaded from an application store server based on the information on the applications executed.

In an embodiment of the present disclosure, if a touch input is detected on the 'download' tab 505, the control unit 160 may display the applications (e.g., Radio, Twitter, Bus, and Dictionary) downloaded in the electronic device in the form of icons representing the corresponding application or a list of the application items as shown in FIG. 5B.

In an embodiment of the present disclosure, if a touch input is detected on the 'recommend' tab 507, the control unit 160 may display the applications installed in the electronic device and/or the applications downloaded from an application store server based on the information on the applications executed in the electronic device during a predetermined time period.

A description is made of the 'recommend' tab 507 of FIG. 5C in detail hereinafter with reference to FIGS. 6A, 6B, and 7.

Figure 6A:
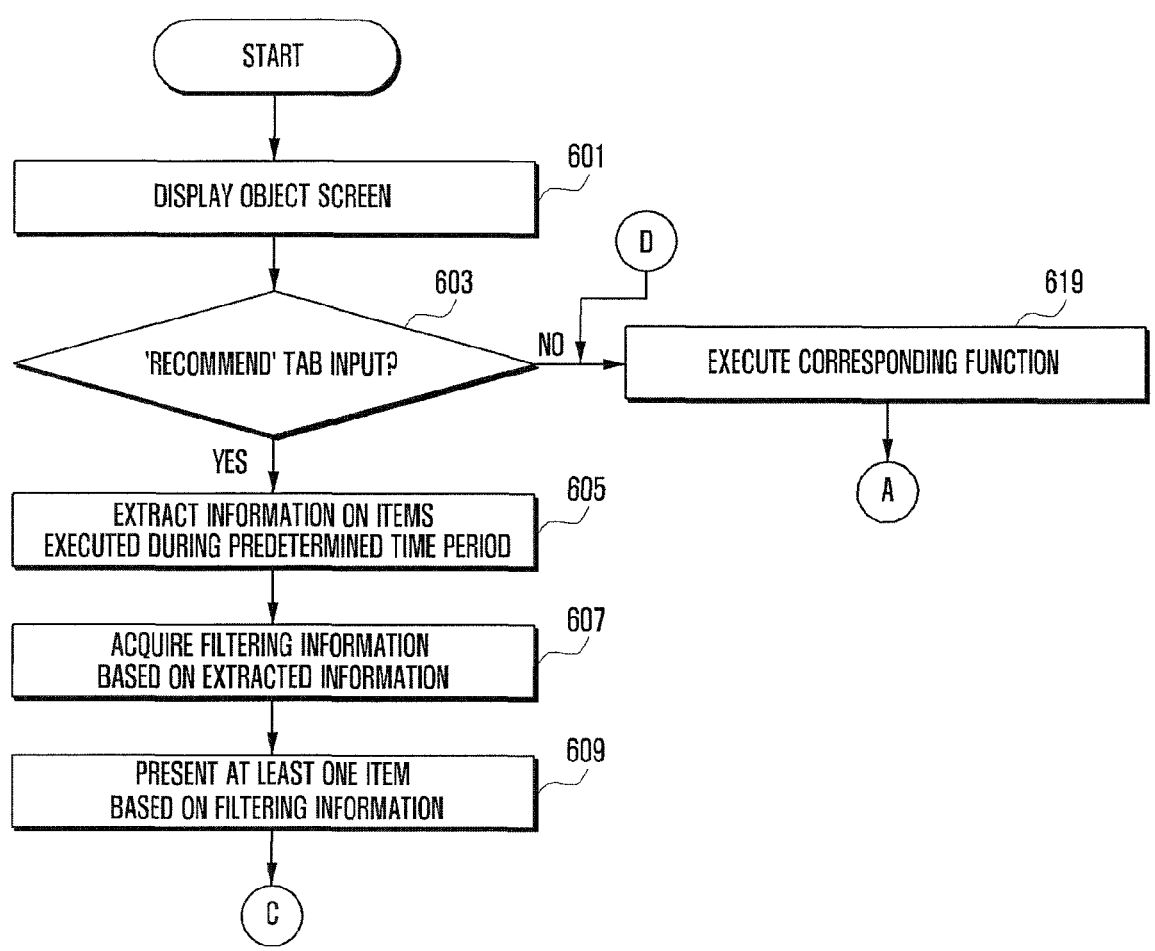
FIGS. 6A and 6B are flowcharts illustrating an electronic device operating method according to another embodiment of the present disclosure.
Figure 6B:
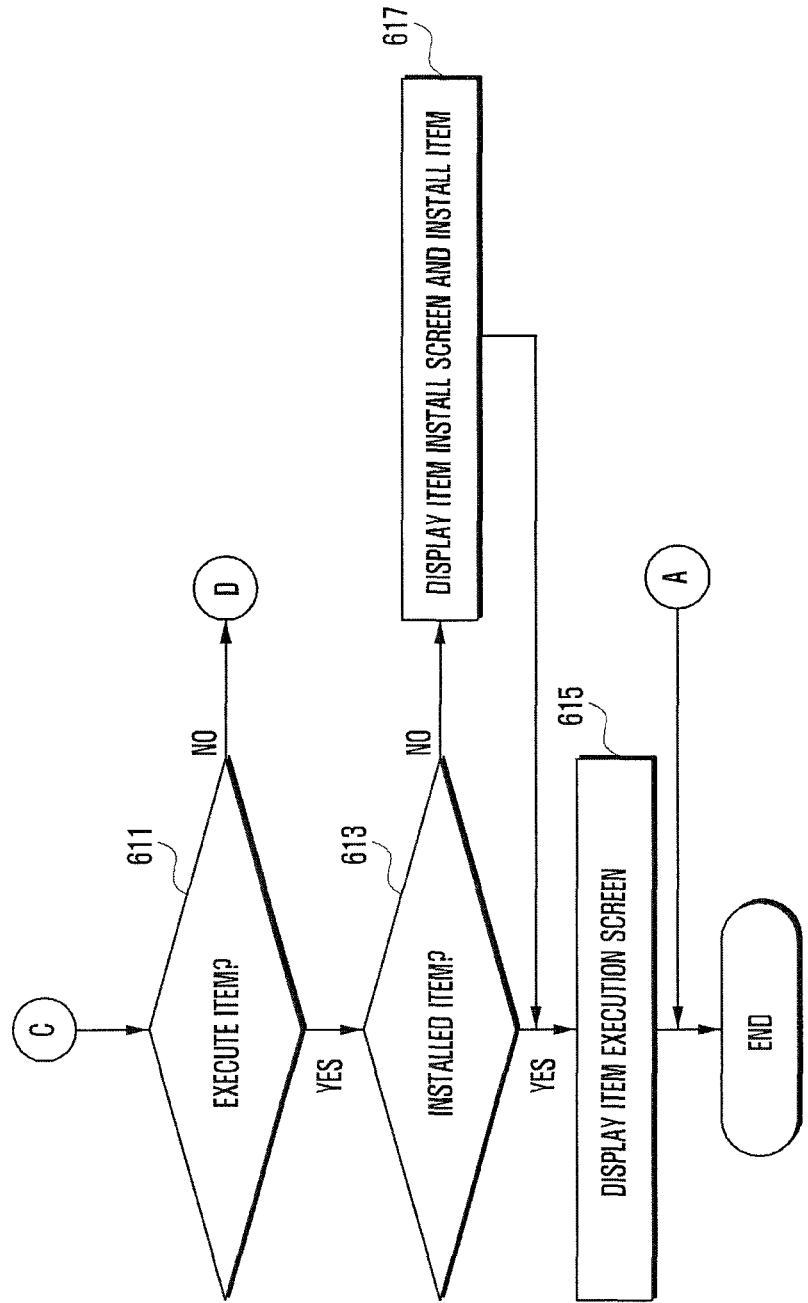

FIGS. 6A and 6B are flowcharts illustrating an electronic device operating method according to another embodiment of the present disclosure. FIG. 7 is a diagram illustrating a screen display for use in explaining the electronic device operating method of FIGS. 6A and 6B according to an embodiment of the present disclosure.

Figure 7:
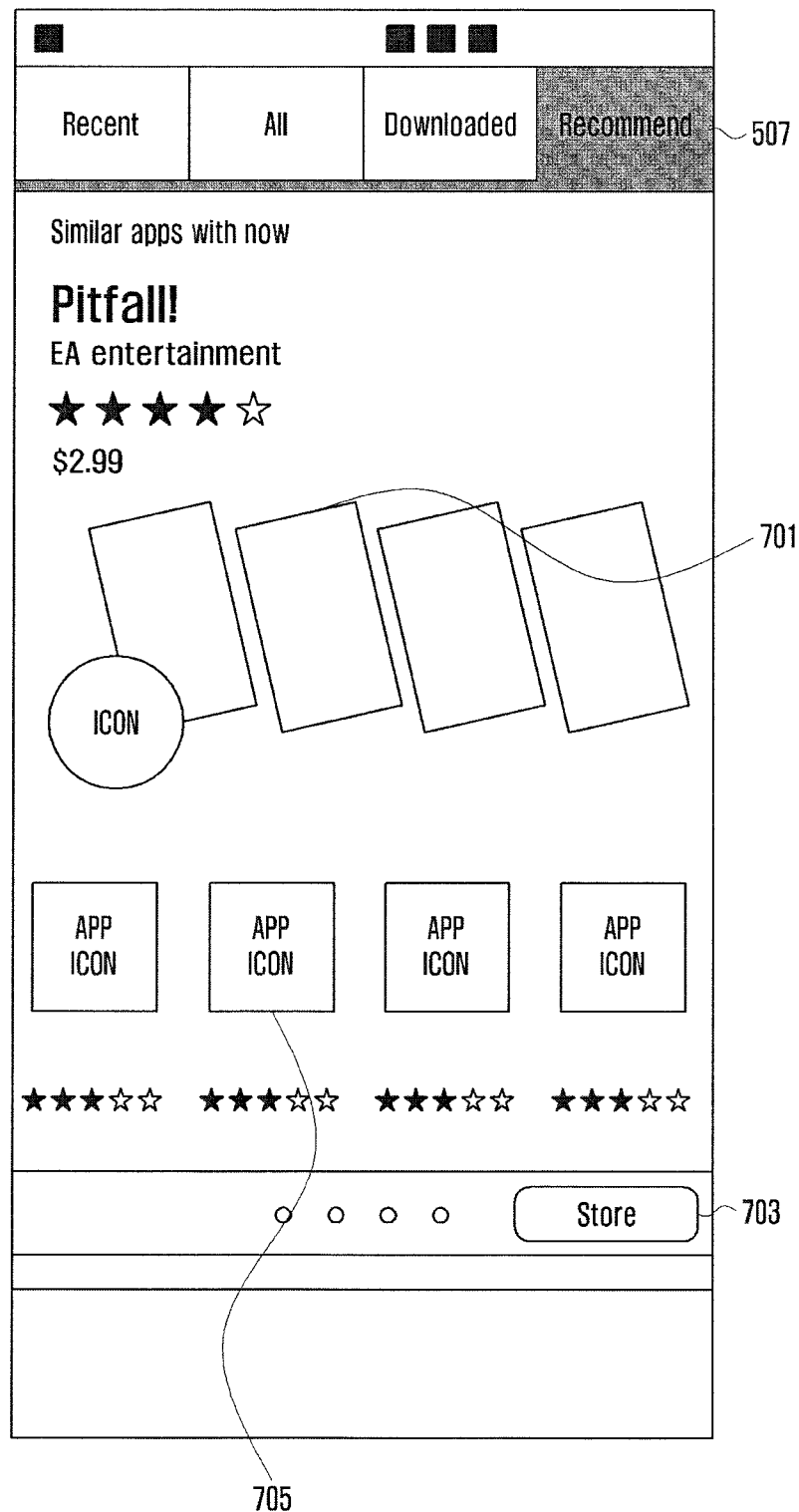
FIG. 7 is a diagram illustrating a screen display for use in explaining an electronic device operating method of FIGS. 6A and 6B according to an embodiment of the present disclosure.

Referring to FIGS. 6A, 6B, and 7, the control unit 160 may control the display module to display the object screen at operation 601. The control unit 160 may determine whether a touch input is detected on the 'recommend' tab of the object screen at operation 603.

If a touch input is detected on the 'recommend' tab, the control unit 160 may extract the information on the item (e.g., application) executed during a predetermined time period in the electronic device at operation 605. The control unit 160 may extracts the information on the icon based on the executed time of the item which has been stored in the storage unit 120. Whenever the item is executed, the control unit 160 may record the IDentifier (ID) of the executed item at a predetermined location for use in extracting the information on the item.

The control unit 160 may acquire the filtering information based on the extracted item information at operation 607. The control unit 160 may present at least one item on the 'recommend' tab screen based on the acquired filtering information at operation 609.

In an embodiment of the present disclosure, the filtering information may acquire the filtering information using the item installed in at least one of the item store server and/or the electronic device. In the case of acquiring the filtering information from the at least one item store server, it is possible to receive at least one of number of recently downloaded times and star rate information based on the item executed recently at the item store server and display N highly-rated items on the 'recommend' tab screen among the recommended items. The information on the items stored in the electronic device may be acquired based on the filtering information of the items stored in the storage unit 120. That is, the information on the items sorted into the same category may be acquired based on the recently-executed item information.

The filtering information may include at least one of unique item ID, item name, representative item image, and item launching method. It may be possible to display a predetermined number (e.g., N) items on the tab screen based on the acquired filtering information.

The control unit 160 may determine whether a command for executing a specific item is detected on the screen presenting the predetermined number of items at operation 611. If an execution command is made to the specific item, the control unit 160 may determine whether the corresponding item is being installed in the electronic device at operation 613. If the item is being installed in the electronic device, the control unit 160 may control the touch screen unit 130 to display the item execution screen at operation 615. If the item is not being installed in the electronic device, the control unit 160 may connects to the item store server and display a screen pertaining to the corresponding item. In detail, the execution screen may include the item store server-recommended item list and details of the items. It may be possible to install the item on the displayed screen at operation 617.

If an input for selecting the 'recommend' tab 507 is detected as shown in FIG. 7, the control unit 160 may control the touch screen unit 130 to display the screen including at least one recommended application based on the recently-executed item information. In an embodiment of the present disclosure the screen of displaying the recommended applications may include at least one of the representative images 701 of the applications that have been received from at least one application store server based on the recently-executed item information, a 'store' button 703 designated for connection to the application store server, and at least one representative images 705 of the recommended applications extracted based on the recently-executed item information among the applications installed in the electronic device. However, the present disclosure is not limited thereto but may be embodied with extra functions. If a touch input is detected on one of the representative images 701 of the applications that have been received from the application store server, the control unit 160 switches the screen to the application store server connection screen so as to allow to check in detail and install selectively the applications. If a touch input is detected on one of the representative images 705 of the applications installed in the electronic device, the control unit 160 may display a corresponding application execution screen.

If no input for selecting the 'recommend' tab is detected at operation 603, the control unit 160 may execute a function in response to the input made to another tab (e.g., switching to 'recent' tab screen, 'object' tab screen, and 'download' tab screen), at operation 619. If no command for executing a specific item is detected at operation 611, the control unit 160 may execute a function in response to the input (e.g., switching to 'recent' tab screen, 'object' tab screen, and 'download' tab screen), at operation 619.

A description is made of the inter-folder navigation, especially when the object is a folder at operation 217 of FIG. 2B, in detail hereinafter with reference FIGS. 8 and 9A to 9F.

Figure 8:
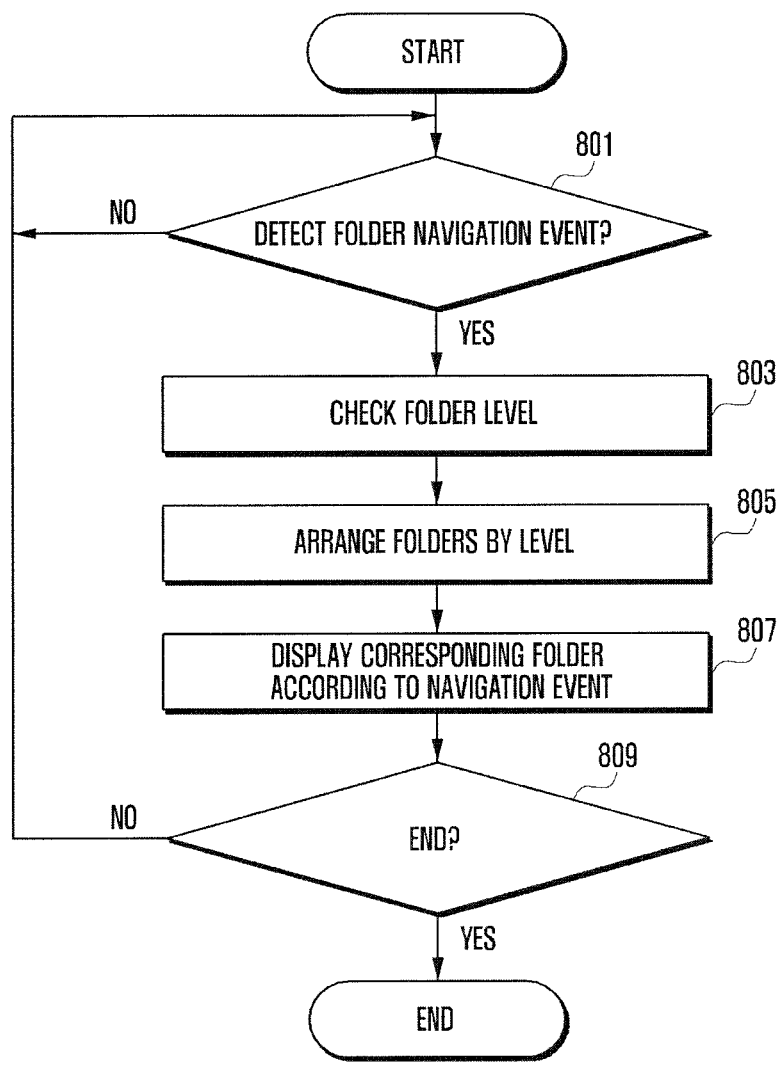
FIG. 8 is a flowchart illustrating an electronic device operating method according to another embodiment of the present disclosure.

FIG. 8 is a flowchart illustrating an electronic device operating method according to another embodiment of the present disclosure. FIGS. 9A to 9F are diagrams for use in explaining the electronic device operating method of FIG. 8 according to an embodiment of the present disclosure.

Referring to FIGS. 8 and 9A to 9F, if a folder including at least one item is selected on the object screen, the control unit 160 may control the touch screen unit 130 to display the folder in the form of a popup window.

The control unit 160 may determine whether a folder navigation event is detected in the folder displayed in the form of the popup window at operation 801. The folder navigation event may be at least one of a touch event, a voice event, and a motion (e.g., slope) event.

In an embodiment of the present disclosure, if a touch event for folder navigation is made, the control unit 160 may detect the touch event made in a direction (upward, downward, leftward, or rightward) and displays a folder according to the direction. In an embodiment of the present disclosure, if a voice event for folder navigation is made, the control unit 160 may detect the voice event made with indication of a direction (upward, downward, leftward, or rightward) and displays a folder according to the direction. In an embodiment of the present disclosure, if a motion event for folder navigation is made, the control unit 160 detects the motion event made with a slope in a direction (upward, downward, leftward, or rightward) and displays a folder according to the direction.

If the folder navigation event is detected, the control unit 160 may check the level (or depth) of the folder presented in the form of the popup window at operation 803. The control unit 160 may align at least one folder having the checked level at operation 805. The at least one folder is aligned in series so as to be scrolled. That is, the at least one same level folder presented in the form of the popup window is sorted into a group.

The control unit 160 may display the corresponding folder in response to the folder navigation event at operation 807. In an embodiment of the present disclosure, the folder presented in the form of popup window may be aligned in a direction corresponding to the folder movement event direction (upward, downward, leftward, or rightward). In an embodiment of the present disclosure, the at least one folder maybe be a low level folder and/or high level folder and thus, if the folder is displayed according to the folder navigation event, the high, low, and equal level folders associated with the current folder are updated to be realigned.

In an embodiment of the present disclosure, in the progress of folder navigation according to the folder navigation event, if there is no further folder to navigate, the control unit 160 may display a popup window notifying that there are no more folders to be displayed. However, the present disclosure is not limited thereto but, if another folder navigation event is made in the left direction at the last folder while the at least one folder has been aligned, the control unit 160 may control such that the last folder is followed by the first folder. If the folder navigation event is made in the right direction at the first folder, the control unit 160 may control such that the first folder is followed by the last folder. That is, the control unit 160 may aligned the folders to appear cyclically by aligning the first and last folders side by side.

The control unit 160 may determine whether an end command is input at operation 809. If the end command is detected, the control unit 160 returns the procedure to operation 801 to determine whether a folder navigation event occurs in the state that a folder is presented in the form of the popup window.

Figure 9A:
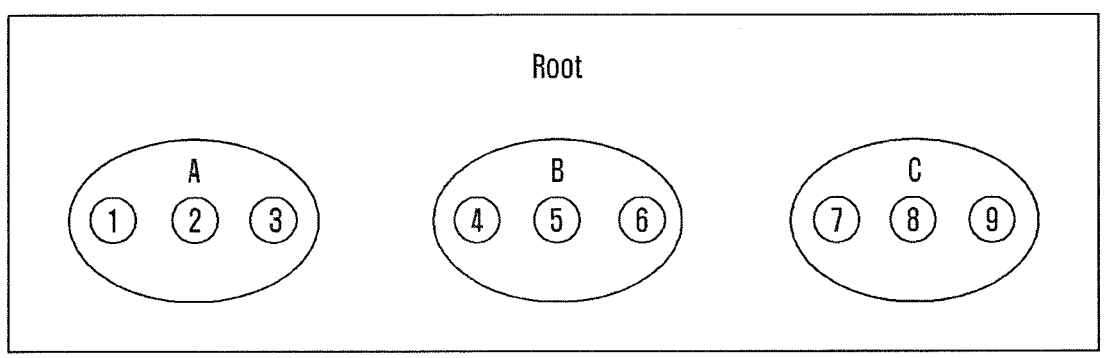
FIGS. 9A, 9B, 9C, 9D, 9E, and 9F are diagrams for use in explaining an electronic device operating method of FIG. 8 according to an embodiment of the present disclosure.

In an embodiment of the present disclosure, the description is made under the assumption that a root folder includes folder A, B and C: folder A including folders 1, 2, and 3; folder B including folders 4, 5, and 6; and folder C including folders 7, 8, and 9 as shown in FIG. 9A.

In an embodiment of the present disclosure, the folders A, B, C are same in level; the folders 1, 2, and 3 same in level; the folders 3, 4, and 5 same in level; and the folders 6, 7, and 8 same in level.

The navigation among the folders of the same level (i.e. navigation among the folders A and B and C, among the folders 1 and 2 and 3, among the folders 4 and 5 and 6, and among the folders 7 and 8 and 9) may be performed with a scroll gesture. Since all the folders A, B, and C belong to the root folder of highest level, if a navigation gesture is made downward, it is possible to move to the root folder. The root folder may be arranged above the folders A, B, and C. The folders A, B, and C that are lower in level than the root folder may be arranged on a scroll bar. If a upward movement gesture is detected in the folder A, the scroll bar having the folders A, B, and C may be replaced by the scroll bare having the folders 1, 2, and 3. Each of the folders 1, 2, and 3 included in the higher folder A may have no lower level folder.

Figure 9B:
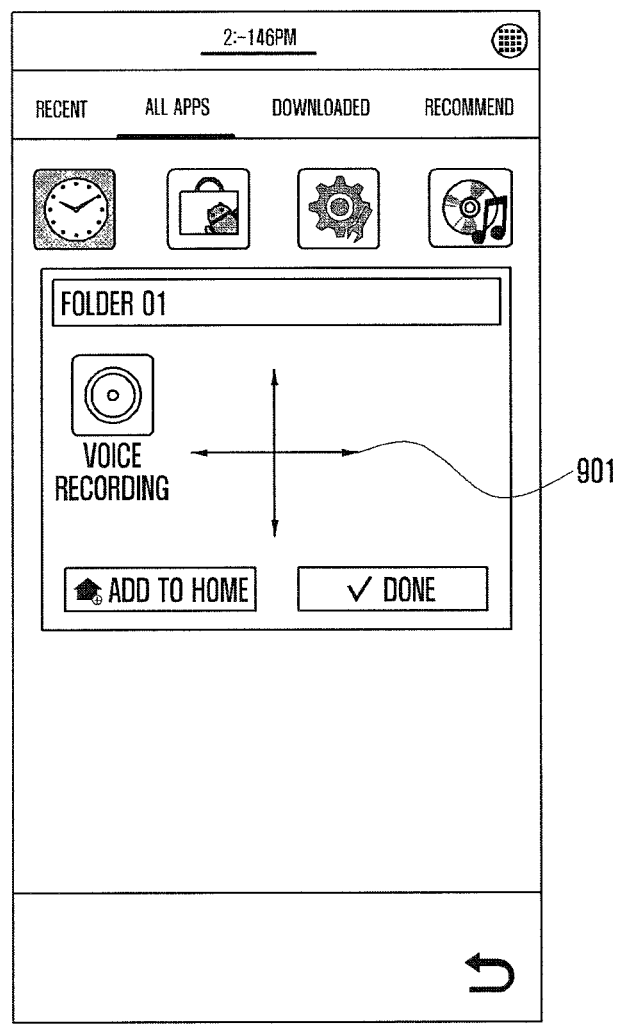

The folder navigation gesture may be made in one of upward, downward, leftward, and rightward directions 901 in FIG. 9B.

Figure 9C:
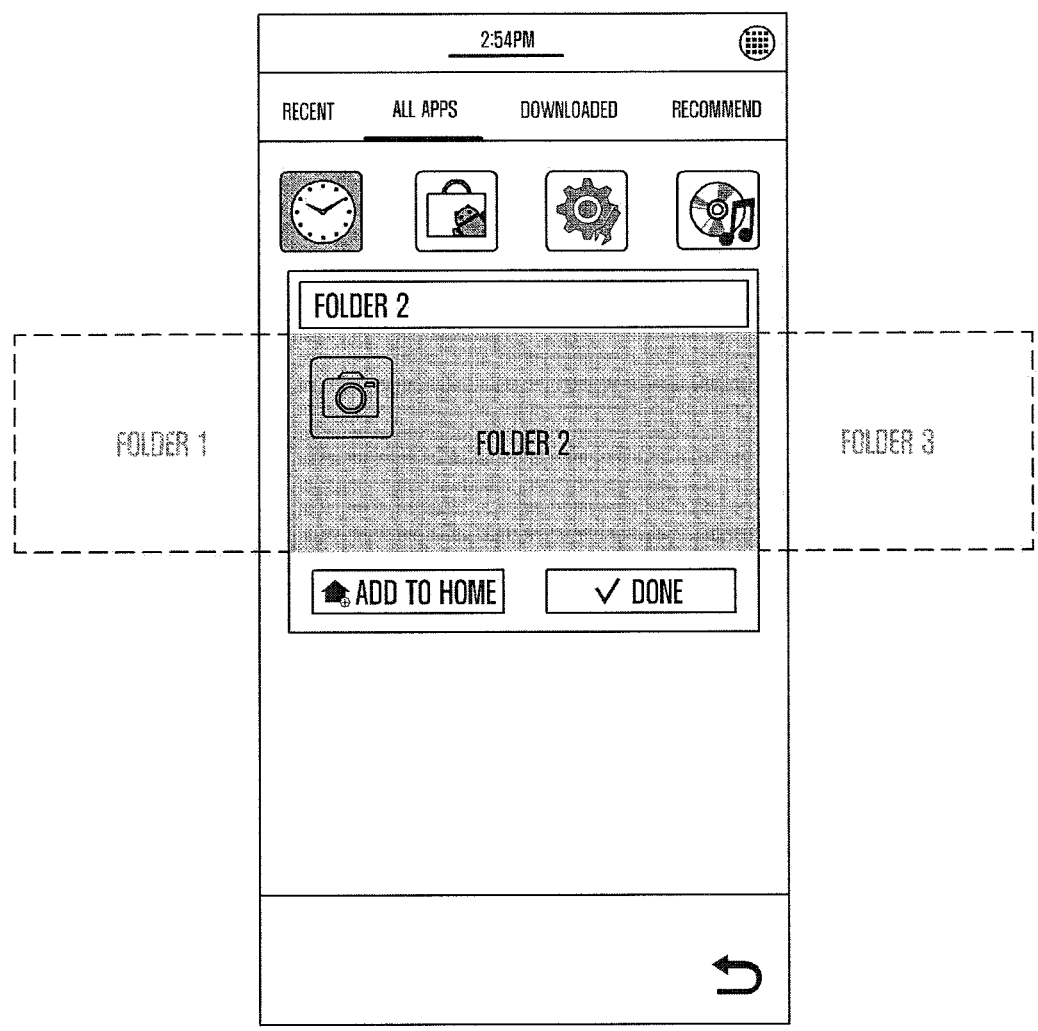

As shown in FIG. 9C, the folders 1 and 3 having the same level as the folder 2 may be arranged at the left and right sides of the folder 2 on the screen of the touch screen unit 130. If the folder navigation gesture is detected, the folders are scrolled in a direction corresponding to the gesture such that the pointer is placed on the folder 1 (e.g., in response to right direction movement gesture) or the folder 3 (e.g., in response to left direction movement gesture).

Figure 9D:
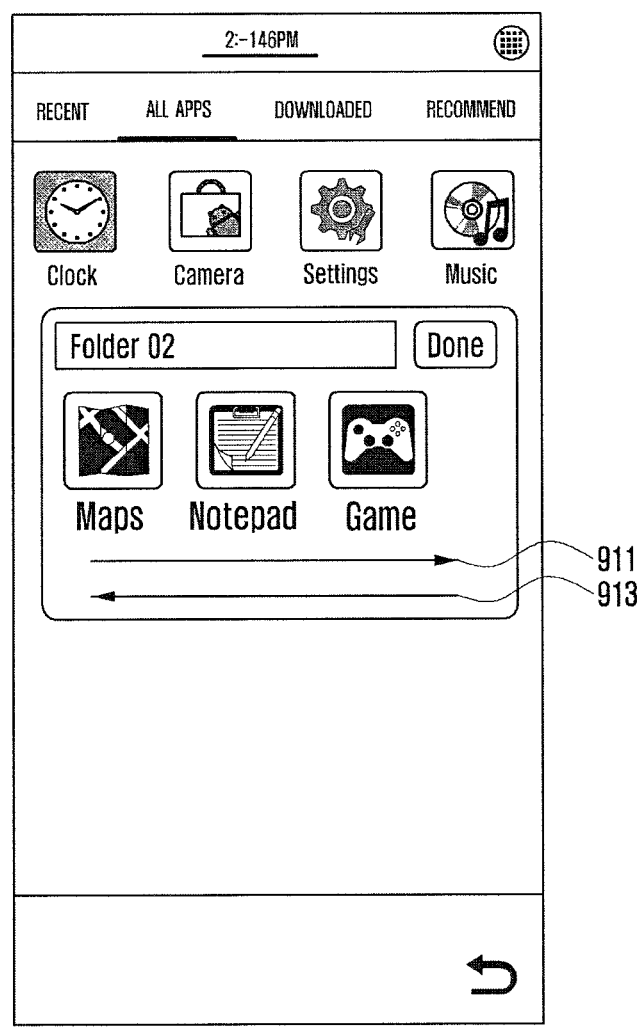
Figure 9E:
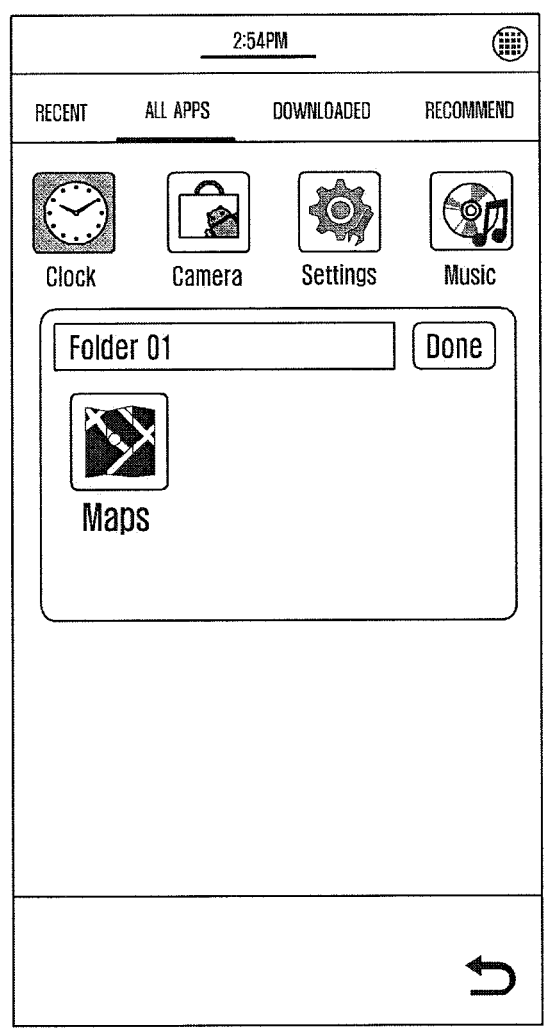
Figure 9F:
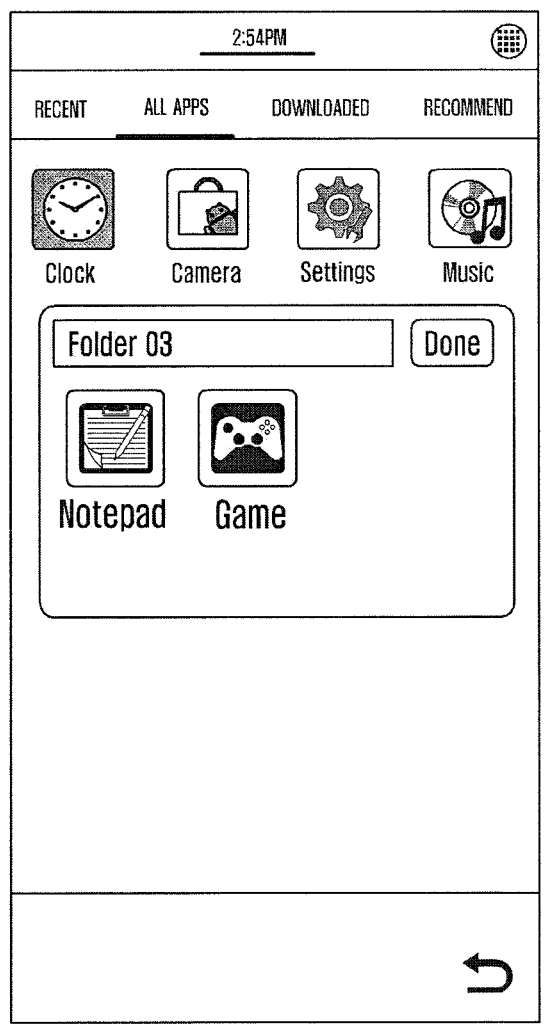

If a folder navigation gesture is made rightward 911 in the state that the folder 2 is opened as shown in FIG. 9D, the folder 1 equal in level to the folder 2 may appear from left as opened as shown in FIG. 9E. If the folder navigation gesture is made leftward 913 in the state that the folder 2 is opened as shown in FIG. 9D, the folder 3 equal in level to the folder 2 may appear from right as opened as shown in FIG. 9F. The present disclosure is not limited thereto but may be embodied in a way of displaying a folder lower in level than the folder 2 in response to an upward folder navigation gesture. The present disclosure is also may be embodied in a way of display a folder higher in level than the folder 2 in response to a downward folder navigation gesture.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While this disclosure has been particularly shown and described with reference to a various embodiment thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    receiving an input for displaying an object screen in a state where a function execution screen is displayed;
    displaying the object screen in an overlaid manner on a part of the function execution screen in response to the input; and
    executing a function in response to a user input made on the object screen,
    wherein the object screen includes a recent tab, a download tab, and a recommend tab, and
    wherein the executing of the function comprises:
        extracting information associated with at least one item executed during a predetermined time period in response to detecting the user input for selecting the recommend tab,
        acquiring filtering information for at least one recommend item based on the information associated with the at least one item, and
        displaying recommend tab screen including the at least one recommend item based on the filtering information,
    wherein the at least one recommend item includes an item associated with the extracted information among at least one item in a server and at least one item installed in the electronic device.

2. The method of claim 1, wherein the object screen comprises at least a part thereof which is semi-transparent.

3. The method of claim 1, wherein the user input is one of a management mode entry input, and an object selection input.

4. The method of claim 3, wherein the executing of the function comprises:
    displaying, if the user input is the management mode entry input, a management mode object screen including at least one object;
    displaying, if an input for creating a folder is detected on at least one object screen, an icon designated for creating a folder around the object to which the folder creation input is made;
    creating, if an input for selecting the icon is detected, the folder containing the at least one object; and
    rearranging automatically an array of the at least one object within the management mode object screen in response to the creating of the folder and displaying the rearranged management mode object screen.

5. The method of claim 3, wherein the executing of the function comprises:
    displaying, if the user input for selecting the recent tab is detected, a recent tab screen; and
    displaying, if the user input selecting a download tab is detected, the download tab screen.

6. The method of claim 1, further comprising:
    determining, if the at least one recommend item is executed, whether the at least one recommend item is installed in the electronic device;
    displaying, if the at least one recommend item is installed in the electronic device, an execution screen of the at least one recommend item; and
    installing the at least one recommend item if the at least one recommend item is not installed in the electronic device.

7. The method of claim 3, wherein the executing of the function comprises executing, if the user input is the object selection input, a function associated with a property of the object which is one of an item and a folder.

8. The method of claim 7, wherein the executing of the function comprises:
    displaying, if the object is the folder, a popup window corresponding to the folder which contains at least one item;
    checking, if an event related to movement direction of a folder is detected in the popup window, a level of the folder;
    aligning folders by level; and
    displaying a popup window of a folder corresponding to the movement direction.

9. The method of claim 8, wherein the event comprises at least one of a touch event, a voice event, and a motion event.

10. The method of claim 4, wherein the executing of the function comprises executing, if an object edit input is detected on the object screen, an object edit function which includes at least one of object deletion and object movement.

11. The method of claim 5, wherein the executing of the function comprises:
- displaying the recent tab screen including at least one of items executed in the electronic device and having execution history; and
- displaying the download tab screen including the items installed in the electronic device.

12. An apparatus for operating an electronic device, the apparatus comprising:
- a touch screen; and
- a processor configured to:
  - receive an input for displaying an object screen in a state where a function execution screen is displayed,
  - display the object screen in an overlaid manner on a part of the function execution screen in response to the input, and
  - execute a function in response to a user input made on the object screen,
- wherein the object screen includes a recent tab, a download tab, and a recommend tab, and
- wherein the processor is further configured to:
  - extract information associated with at least one item executed during a predetermined time period in response to detecting the user input for selecting the recommend tab,
  - acquire filtering information for at least one recommend item based on the information associated with the at least one item, and
  - control the touch screen to display recommend tab screen including at least one recommend item acquired based on the filtering information,
- wherein the at least one recommend item includes an item associated with the extracted information among at least one item in a server and at least one item installed in the electronic device.

13. The apparatus of claim 12, wherein the user input is one of a management mode entry input, and an object selection input.

14. The apparatus of claim 13, wherein the processor is further configured to:
- control the touch screen to display, if the user input is the management mode entry input, a management mode object screen including at least one object,
- display, if an input for creating a folder is detected on at least one object screen, an icon designated for creating a folder around the object to which the folder creation input is made,
- create, if an input for selecting the icon is detected, the folder containing the at least one object, and
- rearrange automatically an array of the at least one object within the management mode object screen in response to the creating of the folder and displaying the rearranged management mode object screen.

15. The apparatus of claim 13, wherein the processor is further configured to:
- control the touch screen to display a recent tab screen if the user input for selecting the recent tab is detected, and
- display the download tab screen if the user input selecting a download tab is detected.

16. The apparatus of claim 12, wherein the processor is further configured to:
- determine, if the at least one recommend item is executed, whether the at least one recommend item is installed in the electronic device,
- control the touch screen to display, if the at least one recommend item is installed in the electronic device, an execution screen of the at least one recommend item, and
- install the at least one recommend item if the at least one recommend item is not installed in the electronic device.

17. The apparatus of claim 13,
- wherein the processor is further configured to execute, if the user input is the object selection input, a function associated with a property of the object which is one of an item and a folder, and
- wherein if the object is the folder, the processor is further configured to:
  - display a popup window corresponding to the folder which contains at least one item,
  - check, if an event related to movement direction of a folder is detected in the popup window, a level of the folder, to align folders by level, and
  - display a popup window of a folder corresponding to the movement direction.

18. The apparatus of claim 15, wherein the processor is further configured to:
- control the touch screen to display the recent tab screen including at least one of items executed in the electronic device and having execution history, and
- display the download tab screen including the items installed in the electronic device.

* * * * *